US008036101B2

(12) United States Patent
Kim et al.

(10) Patent No.: US 8,036,101 B2
(45) Date of Patent: Oct. 11, 2011

(54) RETRANSMISSION APPARATUS AND METHOD FOR HIGH-SPEED DATA PROCESSING

(75) Inventors: Hye-Jeong Kim, Suwon-si (KR);
Do-Young Lee, Suwon-si (KR);
Hyun-Gu Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1161 days.

(21) Appl. No.: 11/800,947

(22) Filed: May 8, 2007

(65) Prior Publication Data

US 2007/0274342 A1 Nov. 29, 2007

(30) Foreign Application Priority Data

May 8, 2006 (KR) .................. 10-2006-0041229
Jun. 22, 2006 (KR) .................. 10-2006-0056441

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04J 3/00* (2006.01)
*H04J 3/16* (2006.01)
*H04L 1/18* (2006.01)
*G08C 25/02* (2006.01)

(52) U.S. Cl. ............ 370/216; 370/465; 714/48; 714/748

(58) Field of Classification Search .................. None
See application file for complete search history.

(56) References Cited

U.S. PATENT DOCUMENTS

| 6,977,888 | B1 | 12/2005 | Frenger et al. |
| 7,310,340 | B2* | 12/2007 | Seidel et al. .................. 370/394 |
| 2003/0103459 | A1 | 6/2003 | Connors et al. |
| 2003/0174662 | A1* | 9/2003 | Malkamaki .................. 370/310 |
| 2005/0013246 | A1* | 1/2005 | Miyake et al. ................ 370/230 |
| 2007/0120950 | A1* | 5/2007 | Jokimies et al. ........... 348/14.01 |
| 2007/0127467 | A1* | 6/2007 | Yi ................................. 370/389 |
| 2007/0150725 | A1* | 6/2007 | Steeb et al. ................... 713/156 |
| 2007/0177630 | A1* | 8/2007 | Ranta et al. ................... 370/473 |
| 2007/0245201 | A1* | 10/2007 | Sammour et al. ............. 714/748 |
| 2008/0273493 | A1* | 11/2008 | Fong ............................. 370/330 |

OTHER PUBLICATIONS

ZTE, "Distributed Feedback for ARQ Operation", 3GPP TSG RAN WG2 #52, R2-060843, Mar. 27, 2006.
Ericsson, "Outer ARQ and HARQ", 3GPP TSG-RAN WG2 #52, R2-060971, Mar. 27, 2006.

* cited by examiner

*Primary Examiner* — Xavier Szewai Wong
(74) *Attorney, Agent, or Firm* — The Farrell Law Firm, P.C.

(57) ABSTRACT

A method for retransmitting high-speed packet data in a transmission apparatus of a mobile communication system that simultaneously performs Automatic Retransmission reQuest (ARQ) that retransmits an ARQ packet reconfigured by allocating a sequence number to data delivered from an upper layer, and Hybrid Automatic Retransmission reQuest (HARQ) that multiplexes a plurality of ARQ packets into one HARQ packet and performs repeated retransmission on the HARQ packet within a maximum retransmission limit value. A transmitting HARQ entity checks a missing ARQ packet and sends a Negative Acknowledgement (NACK) for the missing ARQ packet to a transmitting ARQ entity. The transmitting ARQ entity receives an Acknowledged (ACK) for ARQ packets from a receiving ARQ entity, detects at least one missing ARQ packet according to the NACK and the ACK, configures a retransmission packet with the detected ARQ packet, and retransmits the retransmission packet.

26 Claims, 18 Drawing Sheets

| First Sequence Number | ARQ SEQUENCE NUMBER INFO FOR SAME HARQ PACKET |
|---|---|
| 1 | 2 |
| 3 | 4 |
|  |  |
|  |  |

910

| First Sequence Number | ARQ SEQUENCE NUMBER INFO FOR SAME HARQ PACKET |
|---|---|
| 1 | 2 |
| 3 | 4 |
| 5 | 6 |
| 7 |  |

912

| First Sequence Number | ARQ SEQUENCE NUMBER INFO FOR SAME HARQ PACKET |
|---|---|
| 1 | 2 |
| 3 | 4 |
| 5 | 6 |
| 7 | 8 |

914

| First Sequence Number | ARQ SEQUENCE NUMBER INFO FOR SAME HARQ PACKET |
|---|---|
|  |  |
| 3 | 4.9 |
| 5 | 6 |
| 7 | 8 |

916

| HARQ PROCESSOR ID | ARQ PACKET ID (ARQ ENTITY ID, Sequence Number) |
|---|---|
| 0 | (1,1) |
| 1 | (1,2) |
| 2 | (1,3) |
| 3 | (1,4) |

FIG.16A

| HARQ PROCESSOR ID | ARQ PACKET ID (ARQ ENTITY ID, Sequence Number) |
|---|---|
| 0 | NULL |
| 1 | (1,2) |
| 2 | (1,3) |
| 3 | NULL |

FIG.16B

| HARQ PROCESSOR ID | ARQ PACKET ID (ARQ ENTITY ID, Sequence Number) |
|---|---|
| 0 | NULL |
| 1 | NULL |
| 2 | NULL |
| 3 | NULL |

FIG.16C

| HARQ PROCESSOR ID | ARQ PACKET ID (ARQ ENTITY ID, Sequence Number) |
|---|---|
| 0 | (1,3) |
| 1 | NULL |
| 2 | NULL |
| 3 | NULL |

FIG.16D

RETRANSMISSION APPARATUS AND METHOD FOR HIGH-SPEED DATA PROCESSING

PRIORITY

This application claims priority under 35 U.S.C. §119(a) to Korean Patent Applications filed in the Korean Intellectual Property Office on May 8, 2006 and Jun. 22, 2006, and assigned Serial Nos. 2006-41229 and 2006-56441, respectively, the disclosures of each of which are incorporated herein by reference.

BACKGROUND OF THE INVENTION

1. Field of the Invention

The present invention relates generally to a mobile communication system, and in particular, to an efficient retransmission apparatus and method for high-speed data processing.

2. Description of the Related Art

A Universal Mobile Telecommunication Service (UMTS) system is a $3^{rd}$ Generation Partnership Project (3GPP) asynchronous mobile communication system that is based on Global System for Mobile Communications (GSM) and General Packet Radio Services (GPRS), both of which are European mobile communication systems, and uses Wideband Code Division Multiple Access (WCDMA).

In the 3GPP, now in charge of UMTS standardization, Long Term Evolution (LTE) is under discussion as a next generation mobile communication system of the UMTS system. LTE is technology for realizing high-speed packet based communication at about 100 Mbps. Several LTE schemes are now under discussion. For example, LTE schemes include a scheme of reducing the number of nodes located in a communication path by simplifying architecture of networks, and another scheme of maximally approximating wireless protocols to wireless channels.

An LTE system uses Hybrid Automatic Retransmission reQuest (HARQ) to increase transmission efficiency of high-speed packets, and because the LTE system cannot meet various Quality-of-Service (QoS) conditions only with HARQ, outer Automatic Retransmission reQuest (ARQ) can be performed in an upper layer.

HARQ, as used herein, refers to a technique of soft-combining previously received data with retransmitted data without discarding the previously received data, thereby increasing a reception success rate. More specifically, a HARQ receiving entity determines presence/absence of an error in a received packet and then sends an Acknowledged (HARQ ACK) signal or a Non-Acknowledged (HARQ NACK) signal to a transmitting entity according to the presence/absence of an error. Therefore, the transmitting entity performs retransmission of the corresponding HARQ packet or transmission of a new HARQ packet according to the HARQ ACK/NACK signal. That is, the HARQ technique is characterized by soft-combining a retransmitted packet with a previously received packet, thereby reducing an error occurrence probability.

However, ARQ refers to a technique of checking sequence numbers of received packets and issuing a retransmission request for a missing packet according to the check result, without performing a soft-combining operation between a previously received packet and its retransmitted packets. It is considered that because ARQ and HARQ both serve to recover errored packets, there is no need to operate both of them together. However, because it is hard to obtain a sufficiently low packet error ratio only with HARQ, both ARQ and HARQ should be simultaneously performed in most packet services, for the following reason. That is, as the HARQ ACK/NACK signal is a 1-bit signal, if a HARQ NACK signal is misconceived as a HARQ ACK signal (HARQ NACK/ACK error), the corresponding packet can be completely lost in a HARQ level. As a result, reliability of the HARQ ACK/NACK signal acts as an important factor in determining a packet error ratio in the HARQ level. Therefore, in a mobile communication system employing both HARQ and ARQ, an ARQ transmitting entity can perform fast retransmission using HARQ transmission information.

FIGS. 1A and 1B show a structure of a general radio protocol and an associated packet structure, respectively. The radio protocol of FIG. 1A is composed of ARQ layers 120 and 125, a Medium Access Control (MAC) layer 130, and a physical layer 140. The ARQ layers 120 and 125 can be configured independently for every service, and they satisfy the QoS through an ARQ operation.

An upper layer #1 110 and an upper layer #2 115 are protocol stacks, each of which is configured independently for each individual service. For example, an upper layer can be a protocol stack of an Adaptive Multi Rate (AMR) coder/decoder (codec)—Real Time Protocol (RTP)—User Diagram Protocol (UTP)—Internet Protocol (IP) (codec/RTP/UDP/IP) or a File Transfer Protocol (FTP)—Transmission Control Protocol (TCP)—IP (FTP/TCP/IP). The MAC layer 130 is connected to a plurality of ARQ layers 120 and 125, and multiplexes a plurality of ARQ packets into one HARQ packet. Further, the MAC layer 130 performs a HARQ operation on the multiplexed HARQ packet. The physical layer 140 performs an operation of transmitting and receiving the HARQ packet over a wireless channel. An ARQ packet is a packet reconfigured by allocating sequence numbers so an ARQ operation can be performed on the data delivered from the upper layer. The HARQ packet means a unit packet which is actually transmitted and received on a wireless channel through a HARQ operation.

The ARQ packet of FIG. 1B includes an ARQ packet header 161 composed of a Sequence Number (SN) 163, size information 164 and framing information 165, and a payload 162 to which actual data delivered from the upper layers 110 and 115 are allocated.

For example, if an IP packet 150 has been delivered from the upper layers 110 and 115 to the ARQ layers 120 and 125 of FIG. 1A, the ARQ layers 120 and 125 can transmit the IP packet 150 completely or partially according to wireless channel situation or scheduling situation. A process of reconfiguring an IP packet 150 delivered from the upper layers 110 and 115 in an appropriate size is herein called 'framing', and the framing information 165 is the information with which a receiving entity can restore a packet reconfigured in an appropriate size to the original upper layer packet (IP packet). The sequence number 163 is a sequence number sequentially assigned to the ARQ packet 160, and the size information 164 is the information indicating a size of the ARQ packet 160. The ARQ layers 120 and 125 perform an ARQ operation of storing or assembling ARQ packets using the sequence number 163.

A HARQ packet 170 is composed of a multiplexing header 171 and a payload. The multiplexing header 171 includes multiplexing information of the ARQ packet 160. For example, an identifier of a corresponding one of the ARQ layers 120 and 125 can be the multiplexing information. The payload is composed of more than one multiplexed ARQ packet 160. The radio protocol structure shown in FIG. 1A and the packet structure shown in FIG. 1B can be commonly applied to a base station and a terminal.

FIG. 2 shows a general HARQ operation in HARQ architecture between a transmitting entity and a receiving entity. In a general uplink packet service, a terminal serves as the transmitting entity and a base station serves as the receiving entity. On the contrary, in a general downlink packet service, a terminal serves as the receiving entity, and a base station serves as the transmitting entity. In the following description, therefore, the transmitting entity and the receiving entity should not be limited to one of the terminal and the base station.

In FIG. 2, because various types of services can be provided to one terminal, the transmitting entity includes a plurality of upper layers 280 and a multiplexing block 275, and the receiving entity includes a plurality of upper layers 205 and a demultiplexing block 210. The upper layers 205 and 280 can be regarded as, for example, a set of services using the same QoS, and for convenience, the flow that has occurred in one upper layer will be referred to below as a 'QoS flow'.

The multiplexing (MUX) block 275 serves to insert multiplexing information into the data generated by the several upper layers 280 and to deliver the resulting data to a HARQ block 272. On the contrary, the demultiplexing (DEMUX) block 210 performs an operation of delivering multiplexing information of the data provided from a HARQ block 212 to the appropriate upper layers 205.

The HARQ blocks 212 and 272, devices for performing a HARQ operation, are each made up of several HARQ processors. A HARQ processor is a unit device in charge of transmission/reception of a HARQ packet. A transmitting HARQ processor (i.e. a HARQ processor in the transmitting entity) takes charge of transmission and retransmission of user packets, and a receiving HARQ processor (i.e. HARQ processor in the receiving entity) takes charge of reception of a HARQ packet and transmission of a HARQ Acknowledgement (HARQ ACK)/HARQ Negative Acknowledgement (HARQ NACK) signal.

The HARQ blocks 212 and 272 exist in pairs in the transmitting entity and the receiving entity, and each of the HARQ blocks 212 and 272 includes a plurality of HARQ processors, thereby enabling continual transmission/reception. An operation of the HARQ processor includes transmitting a HARQ packet, receiving HARQ ACK/NACK information in response thereto, and performing retransmission on the HARQ packet according to the HARQ ACK/NACK information. For example, therefore, if there is only one HARQ processor, the transmitting entity, after transmitting user data, cannot transmit another packet until it receives HARQ ACK/NACK information for the user data. However, when several HARQ processors are provided, while one processor waits for a HARQ ACK/NACK, other processors can transmit data. This makes continuous transmission/reception possible.

A basic operation of the HARQ processor is as follows.

A transmitting HARQ processor, any one of HARQ P1 250, HARQ P2 260, HARQ P3 265 and HARQ P4 270, channel-codes and transmits data received from the multiplexing block 275, and stores the channel-coded data in a buffer (not shown) for later retransmission. The transmitting HARQ processor discards (flushes) the data stored in the buffer upon receipt of ACK information for the data, and performs retransmission on the data upon receipt of NACK information for the data.

On the contrary, a receiving HARQ processor, any one of HARQ P1 215, HARQ P2 220, HARQ P3 225 and HARQ P4 230, channel-decodes the data received over a physical channel, and determines presence/absence of an error through a Cyclic Redundancy Check (CRC) operation of checking whether there is any error detected from the data. In presence of an error, the receiving HARQ processor stores the data in a buffer (not shown), and sends a HARQ NACK signal. Thereafter, if retransmitted data for the data is received, the receiving HARQ processor soft-combines the retransmitted data with the data previously stored in the buffer, and then determines again presence/absence of an error in the soft-combined data. If it is determined that there is still an error, the receiving HARQ processor sends a HARQ NACK signal and repeats the above process. However, if it is determined that there is no error, the receiving HARQ processor sends a HARQ ACK signal and delivers user data to the demultiplexing block 210.

The HARQ operation can increase its reliability by retransmitting an errored HARQ packet and performing soft-combining thereon in this manner. However, it is inefficient to achieve a very low Block Error Rate (LBER) only with the HARQ operation.

This is caused by the following two reasons.

1. If there is an error in a HARQ ACK/NACK signal, the HARQ processor fails to detect the error.

2. Because HARQ transmission/retransmission is performed within a relatively short time, a HARQ processor fails to acquire time diversity gain. For example, if a terminal falls in deep fading for several tens of milliseconds, the terminal can hardly successfully transmit a HARQ packet through HARQ retransmission. In order to make up for the limit of the HARQ operation, there is a need to perform an ARQ operation. With reference to FIG. 3, a description will now be made of an operation of performing HARQ with use of ARQ.

FIG. 3 illustrates possible problems occurring when HARQ and ARQ operate independently according to the prior art. In FIG. 3, an ARQ operation is performed by transmitting ARQ layers 361, 362 and 363 (i.e. ARQ layers in the transmitting entity) and receiving ARQ layers 311, 312 and 313 (i.e. ARQ layers in the receiving entity). The transmitting ARQ layers 361, 362 and 363 each store an ARQ packet in a retransmission buffer for its possible retransmission, even after transmitting an upper layer packet delivered from an upper layer.

The transmitting ARQ layers 361, 362 and 363 form an ARQ assembly clock and each configure as many ARQ packets as the amount of data that it will transmit for a transmission period. The transmitting ARQ layer can reach the amount of desired transmission data by generating several ARQ packets, or can generate one ARQ packet corresponding to the amount of desired transmission data. If a size of a desired ARQ packet is not identical to a size of the upper layer packet, the transmitting ARQ layer can deliver only a part of the ARQ layer by dividing the upper layer packet, or can deliver a plurality of upper layer packets. The transmitting ARQ layer configures the ARQ packet by inserting sequence number information, size information, and framing information into an upper layer packet. The transmitting ARQ layer stores the ARQ packet in a retransmission buffer for later retransmission after storing it to a lower layer. The lower layer may include a MAC layer, a HARQ layer 370, and a physical layer. The HARQ layer 370 multiplexes the received ARQ packets into a HARQ packet, and then transmits the HARQ packet in step 380 to the receiving entity over a physical channel.

The receiving ARQ layers 311, 312 and 313 are each composed of an assembly block, a reception buffer, and a retransmission management block. The physical layer receives a HARQ packet over a physical channel, and a MAC/HARQ layer 320 demultiplexes the received HARQ packet to restore ARQ packets, and delivers the ARQ packets to the corresponding receiving ARQ layers 311, 312 and 313. The reception buffer stores the ARQ packets received from the HARQ layer 320 according to their sequence numbers, and delivers assemblable ARQ packets to the assembly block. The ARQ retransmission management block checks sequence numbers of the ARQ packets stored in the reception buffer, and sends ARQ ACK signals for the normally received ARQ packets and ARQ NACK signals for the reception-failed ARQ packets to the transmitting ARQ assembly block of ARQ layers 361, 362 and 363 in steps 341, 342, 343. The ARQ assembly block reconfigures (reassembles) the original upper layer packet with the ARQ packets referring to framing headers of the ARQ packets delivered from the reception buffer, and then delivers the reconfigured upper layer packet to the upper layer.

Upon receiving the response signals (ACK/NACK signals) for the ARQ packets previously transmitted to the receiving ARQ layers 311, 312 and 313, the transmitting ARQ layers 361, 362 and 363 each discard the corresponding ARQ packet from the ARQ retransmission buffer in response to the ACK signal, and schedule retransmission of the corresponding ARQ packet in response to the NACK signal.

As described above, ARQ is performed on an ARQ packet by ARQ packet basis. The transmitting ARQ layers 361, 362 and 363 attach sequence numbers to ARQ packets before transmission, and the receiving ARQ layers 311, 312 and 313 check the sequence numbers of the received ARQ packets to determine whether there is any missing (reception-failed) ARQ packet. For example, if the receiving ARQ layers have normally received an ARQ packet with a sequence number #X and an ARQ packet with a sequence number #(X+2), but have failed to receive an ARQ packet with a sequence number #(X+1), the receiving ARQ layers send a request for retransmission of the ARQ packet with a sequence number #(X+1) to the transmitting ARQ layers. That is, the receiving ARQ layers send a NACK signal to the transmitting ARQ layers in response to the ARQ packet with a sequence number #(X+1), to issue a request for retransmission of the ARQ packet with a sequence number #(X+1).

A description will now be made of a HARQ operation performed independently of the ARQ operation in FIG. 3.

After transmitting a HARQ packet obtained by multiplexing a plurality of ARQ packets, if the transmitting HARQ layer 370 receives a HARQ NACK from the receiving HARQ layer 320, the transmitting HARQ layer 370 retransmits the HARQ packet. That is, upon failure to receive a HARQ ACK, the transmitting HARQ layer 370 repeats this operation as many times as a maximum number of retransmissions. If the transmitting HARQ layer 370 has failed to receive the HARQ ACK even after it has repeated the operation as many times as the maximum number of retransmissions, i.e. if the maximum retransmission limit occurs, the receiving HARQ layer 320 sends a HARQ ACK/NACK in step 382, perceiving the occurrence of the maximum retransmission limit, and the transmitting HARQ layer 370, after receiving the HARQ ACK/NACK, sends a request for retransmission of the corresponding packet to the ARQ layers 361, 362 and 363.

In this case, the transmitting HARQ layer 370 cannot perform retransmission until it receives an ARQ NACK. Therefore, when the HARQ maximum retransmission limit occurs, the transmitting HARQ layer 370 can hardly perform fast retransmission. Also, the receiving ARQ layers 311, 312 and 313 should send NACKs for all reception-failed ARQ packets, causing an increase in the wireless load and the ARQ NACK processing load. In addition, because the receiving ARQ layers 311, 312 and 313 use several types of ARQ ACK/NACKs, packet processing is complex in the ARQ layers. Further, while the HARQ layer 370 attempts retransmission, if the receiving ARQ layer sends a NACK, determining that an arbitrary ARQ packet is missing, then the HARQ layer 370 may perform repeated retransmission on the same ARQ packet. This defect causes deterioration in packet transmission/reception performance.

To solve the problem of FIG. 3, conventional technology proposes a method for efficiently operating a HARQ layer and an ARQ layer, which operate independently, as shown in FIG. 4. That is, a receiving HARQ layer 420 uses a method of providing information on success/failure in packet transmission to transmitting ARQ layers 461, 462 and 463.

Referring to FIG. 4, a transmitting HARQ layer 470 sends transmission failure information (Local NACK) and transmission success information (Local ACK) to the transmitting ARQ layers 461, 462 and 463 so they may determine whether there is a need for retransmission of the corresponding packet. The receiving ARQ layers 411, 412 and 413 do not use the ARQ ACK/NACK for a missing packet.

In other words, in FIG. 4, in order to solve problems of a load caused by an ARQ operation and possible occurrence of a repeated retransmission request due to the use of the HARQ layer, a transmitting entity and a receiving entity do not perform ARQ. Instead, the receiving HARQ layer 420 performs demultiplexing on the HARQ packet transmitted via the transmitting HARQ layer 470, and the corresponding ARQ layers 411, 412 and 413 perform error check on the received demultiplexed ARQ packets, and deliver the results to the receiving HARQ layer 420.

Therefore, the receiving HARQ layer 420 sends a HARQ NACK signal to the transmitting HARQ layer 470, causing the HARQ layer 470 to perform retransmission.

In addition, the receiving HARQ layer 420 performs HARQ NACK/ACK error detection, and if a HARQ NACK is recognized as a HARQ ACK due to its change, i.e. if it is determined that a HARQ NACK/ACK error has occurred, the receiving HARQ layer 420 sends a NACK/ACK error indicator to the transmitting HARQ layer 470. A process of sending a NACK/ACK error indicator will be described in FIG. 5.

Finally, upon receipt of a Local ACK from the transmitting HARQ layer 470, the transmitting ARQ layers 461, 462 and 463 can remove the corresponding ARQ packet from a retransmission buffer. However, upon receipt of a Local NACK reported from the transmitting HARQ layer 470, the transmitting ARQ layers 461, 462 and 463 prepare for retransmission of the corresponding ARQ packet.

FIG. 5 shows an operation of detecting a NACK/ACK error according to the prior art. In FIG. 5, a transmitting HARQ layer (or HARQ transmitting entity) 555 transmits, in step 510, a HARQ packet to a receiving HARQ layer (or HARQ receiving entity) 505 over a physical channel. The receiving HARQ layer 505 performs error detection on the received HARQ packet. If there is an error in the received packet, the receiving HARQ layer 505 sends, in step 520, a HARQ NACK to the transmitting HARQ layer 555. Even though the receiving HARQ layer 505 has sent the HARQ NACK, if the transmitting HARQ layer 555 transmits a new HARQ packet in step 530 instead of retransmitting the HARQ packet to the receiving HARQ layer 505, the receiving HARQ layer 505 considers, in step 540, that a NACK/ACK error has occurred for the previously sent NACK response signal. That is, when the NACK signal for the HARQ packet transmitted in step 510 experiences an error while it is transmitted over a wireless channel in step 520, the transmitting HARQ layer 555 recognizes the NACK signal as an ACK signal, and thus transmits a new HARQ packet in response to the ACK signal in step 530.

Upon detecting the NACK/ACK error in this way, the receiving HARQ layer 505 sends a NACK/ACK error indicator to the transmitting HARQ layer 555 in step 550.

FIG. 6 illustrates possible problems occurring when the conventional HARQ and ARQ operate as shown in FIGS. 3 to 5.

In FIG. 6, 'case 1' corresponds to a case in which a receiving ARQ layer 601 normally receives an ARQ packet 610 transmitted by a transmitting ARQ layer 608 in step 616. The ARQ packet 610 is delivered to the receiving ARQ layer 601, passing through a transmitting HARQ layer 605 and a receiving HARQ layer 603 in steps 612 and 616, respectivley.

After receiving a HARQ ACK indicating normal receipt of the transmitted packet from the receiving HARQ layer 603 in step 614, the transmitting HARQ layer 605 starts a timer, in step 630, with which the transmitting HARQ layer 605 waits for an NACK/ACK error indicator. Thereafter, if the timer expires in step 632, the transmitting HARQ layer 605 reports a Local ACK to the transmitting ARQ layer 608 in step 618.

Upon receipt of the Local ACK reported from the transmitting HARQ layer 605, the transmitting ARQ layer 608 can finally remove the packet from a retransmission buffer in step 620, determining that the corresponding ARQ packet has been normally received at the receiving ARQ layer 601.

'case 2' corresponds to a case in which packet transmission is failed, even though the transmitting HARQ layer 605 has attempted retransmission as many times as the maximum number of retransmissions in steps 640 to 650. In this case, the transmitting HARQ layer 605 reports a Local NACK to the transmitting ARQ layer 608 in step 652, and the transmitting ARQ layer 608 prepares to retransmit the corresponding ARQ packet in step 654.

'case 3' corresponds to a case in which a HARQ NACK is misconceived as a HARQ ACK in step 674. After receiving a HARQ ACK, the transmitting HARQ layer 605 starts a timer in step 676 with which the HARQ layer 605 waits for a NACK/ACK error indicator. Upon receipt of a NACK/ACK error indicator from the receiving HARQ layer 603 in step 678 before expiration of the timer, the transmitting HARQ layer 605 reports a Local NACK to the transmitting ARQ layer 608 in step 680. Upon receipt of the Local NACK, the transmitting ARQ layer 608 prepares to retransmit the corresponding ARQ packet.

This method has the following problems, although it has an advantage of not using the ARQ ACK/NACK.

1. The HARQ layer is complex in operation because it should determine presence/absence of a NACK/ACK error and perform the corresponding process.

2. Even though the receiving HARQ layer 603 has sent a HARQ NACK, if a new HARQ packet is received, the receiving HARQ layer 603 determines that there is a NACK/ACK error. However, if the transmission is failed, even though the transmitting HARQ layer 605 has sent the corresponding packet as many times as the maximum number of retransmissions, the transmitting HARQ layer 605 transmits a new HARQ packet. This case can hardly be distinguished from the case where the NACK/ACK error has occurred.

3. Because the transmitting HARQ layer 605 should always report a Local ACK for the successfully transmitted packet, the transmitting HARQ layer 605 and the transmitting ARQ layer 608 both increase in processing overhead.

4. There is no detailed scheme for sending the NACK/ACK error indicator.

5. There is no scheme for coping with the case where the NACK/ACK error indicator is missing or changes. In the case where the NACK/ACK error indicator is missing, if the timer expires while the transmitting HARQ layer 605 waits for the NACK/ACK error indicator, the transmitting HARQ layer 605 generates a Local ACK, determining that there is no NACK/ACK error.

Detailed schemes for solving the foregoing problems have not yet been proposed in current mobile communication systems. Therefore, a need exists for an efficient packet retransmission method for transmitting high-speed data taking the foregoing problems into account.

SUMMARY OF THE INVENTION

The present invention addresses at least the above-described problems and/or disadvantages and provides at least the advantages described below. Accordingly, an aspect of the present invention is to provide an efficient retransmission apparatus and method for processing high-speed data in a mobile communication system.

Another aspect of the present invention is to provide a retransmission apparatus and method for minimizing signal transmission by separately performing a HARQ operation and an ARQ operation in a mobile communication system.

Another aspect of the present invention is to provide a retransmission apparatus and method for minimizing signal transmission by preventing repeated transmission of a HARQ operation and an ARQ operation when the HARQ operation and the ARQ operation operate separately for data transmission in a mobile communication system.

According to one aspect of the present invention, there is provided a method for retransmitting high-speed packet data in a transmission apparatus of a mobile communication system that simultaneously performs ARQ that retransmits an ARQ packet reconfigured by allocating a sequence number to data delivered from an upper layer, and HARQ that multiplexes a plurality of ARQ packets into one HARQ packet and performs repeated retransmission on the HARQ packet within a maximum retransmission limit value. The transmission method includes a transmitting HARQ entity checking a missing ARQ packet and sending a NACK for the missing ARQ packet to a transmitting ARQ entity; the transmitting ARQ entity receiving an ACK for ARQ packets from a receiving ARQ entity; and the transmitting ARQ entity detecting at least one missing ARQ packet according to the NACK and the ACK, configuring a retransmission packet with the detected ARQ packet, and retransmitting the retransmission packet.

According to another aspect of the present invention, there is provided a method for retransmitting high-speed packet data in a reception apparatus of a mobile communication system including a HARQ entity that restores a plurality of ARQ packets by demultiplexing a HARQ packet received from a lower layer, and an ARQ entity that reconfigures the received ARQ packets into an original upper layer packet and then delivers the upper layer packet to an upper layer. The reception method includes a receiving HARQ entity sending a NACK for a missing ARQ packet to a transmitting HARQ entity; and a receiving ARQ entity sending an ACK for an ARQ packet normally received from the transmitting HARQ entity, to a transmitting ARQ entity.

According to further another aspect of the present invention, there is provided a transmission apparatus for retransmitting high-speed packet data in a mobile communication system that simultaneously performs ARQ that retransmits an ARQ packet reconfigured by allocating a sequence number to data delivered from an upper layer, and HARQ that multiplexes a plurality of ARQ packets into one HARQ packet and performs repeated retransmission on the HARQ packet within a maximum retransmission limit value. The transmission apparatus includes a transmitting HARQ entity for reporting a NACK for a missing ARQ packet; and a transmitting ARQ entity for receiving an ACK for ARQ packets from a receiving ARQ entity, detecting at least one missing ARQ packet according to the NACK and the ACK, configuring a retransmission packet with the detected ARQ packet, and retransmitting the retransmission packet.

BRIEF DESCRIPTION OF THE DRAWINGS

The above and other aspects, features and advantages of the present invention will become more apparent from the following detailed description when taken in conjunction with the accompanying drawings in which:

FIGS. 16A to 16D are diagrams illustrating examples of a HARQ transmission status table for prevention of repeated transmission according to the present invention.

DETAILED DESCRIPTION OF THE PREFERRED EMBODIMENTS

Preferred embodiments of the present invention will now be described in detail with reference to the annexed drawings. In the following description, descriptions of known functions and configurations incorporated herein has been omitted for clarity and conciseness.

The present invention, as described herein, provides a method for efficiently performing retransmission for high-speed packet data transmission in a mobile communication system. In addition, the present invention provides a method of using a Local Non-Acknowledged (NACK) between a transmitting Hybrid Automatic Retransmission reQuest (HARQ) layer and a transmitting Automatic Retransmission reQuest (ARQ) layer, and of realizing a simple ARQ operation to solve the possible high-complexity operation problem of the transmitting HARQ layer. That is, in the present invention, retransmission is achieved by retransmission of an ARQ layer through a Local NACK of a HARQ layer. The present invention provides a method of using an ARQ ACK as a precaution against a HARQ Acknowledged (ACK)/NACK error. Also, the present invention provides a method for reducing a processing load of an ARQ NACK and a load in a wireless environment by preventing an ARQ layer from using an ARQ NACK.

Although the present invention will be described herein for application to the Long Term Evolution (LTE) system, the present invention can be applied to every mobile communication system using a retransmission operation without separate modification. It would be obvious to those skilled in the art that the term 'layer' as used herein refers to an entity having a software or hardware structure.

Figure 1A:
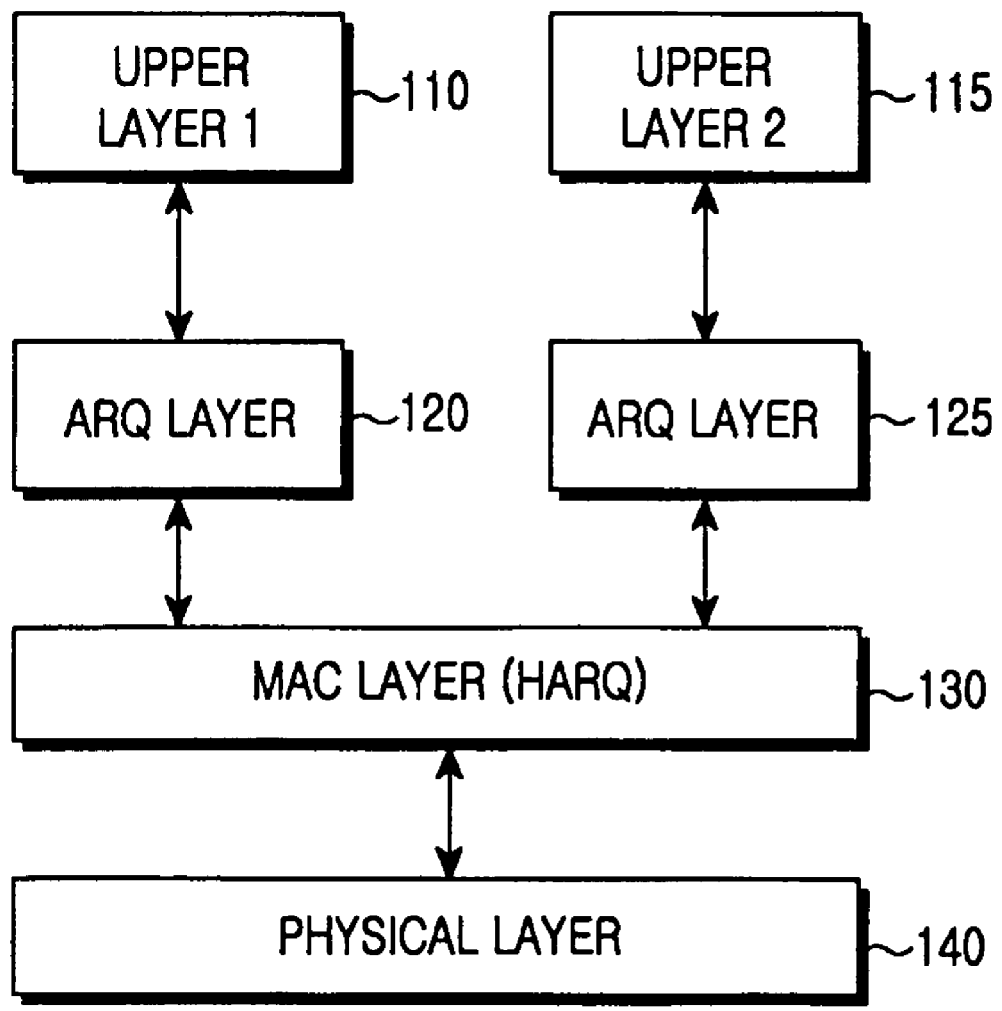
FIGS. 1A and 1B are diagrams illustrating a structure of a general radio protocol and an associated packet structure therefore, respectively, according to the prior art.
Figure 1B:
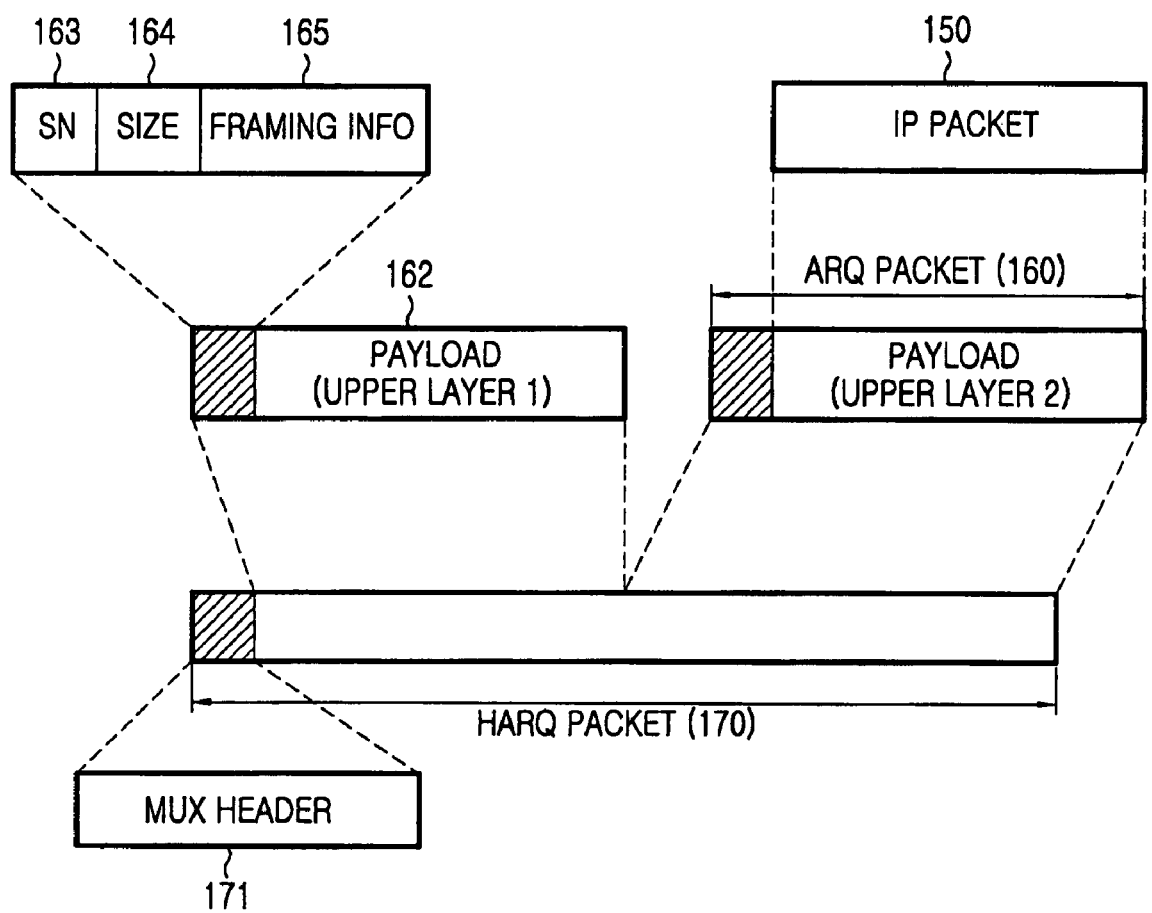
Figure 2:
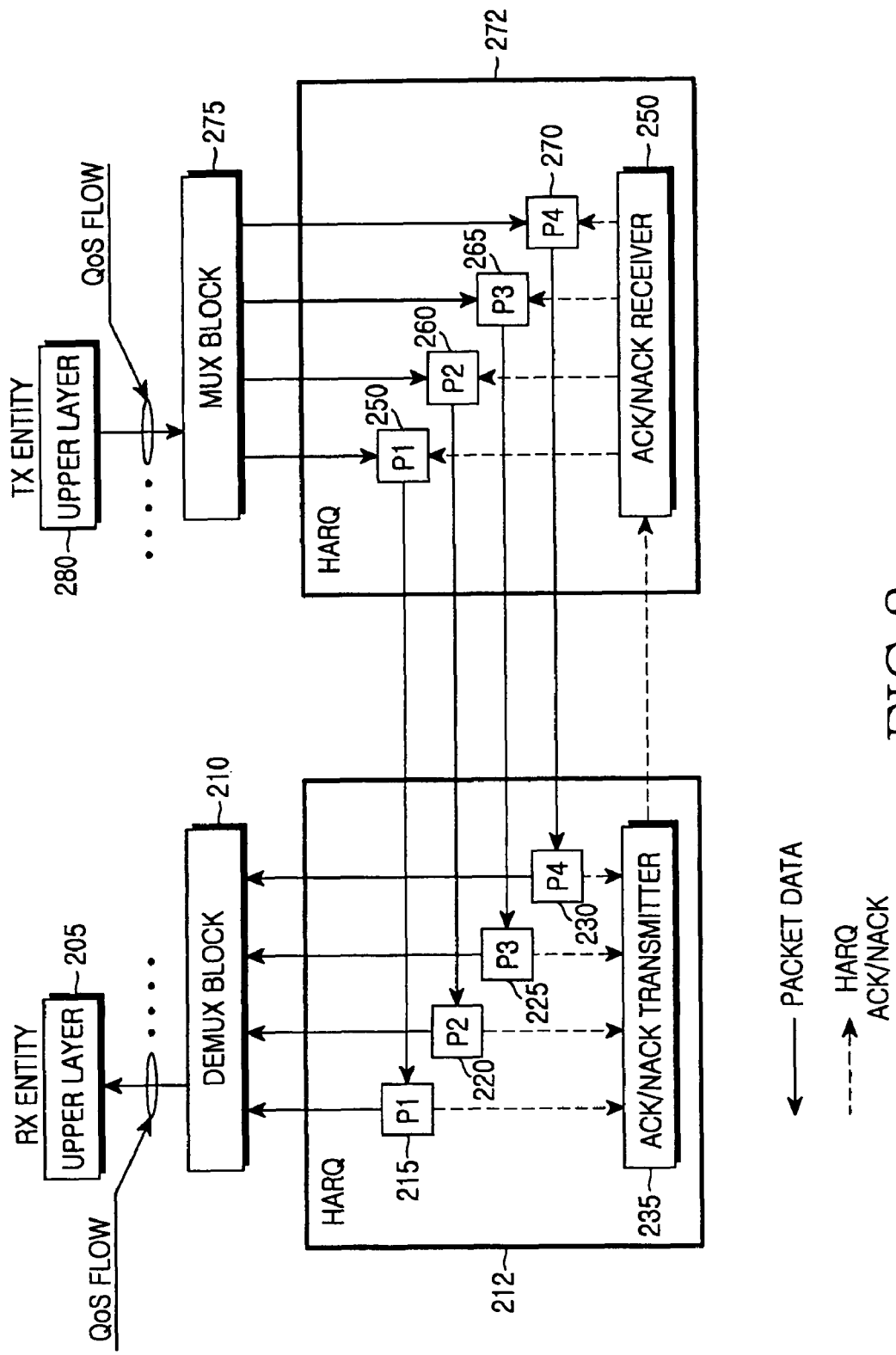
FIG. 2 is a diagram illustrating a general HARQ operation according to the prior art.
Figure 3:
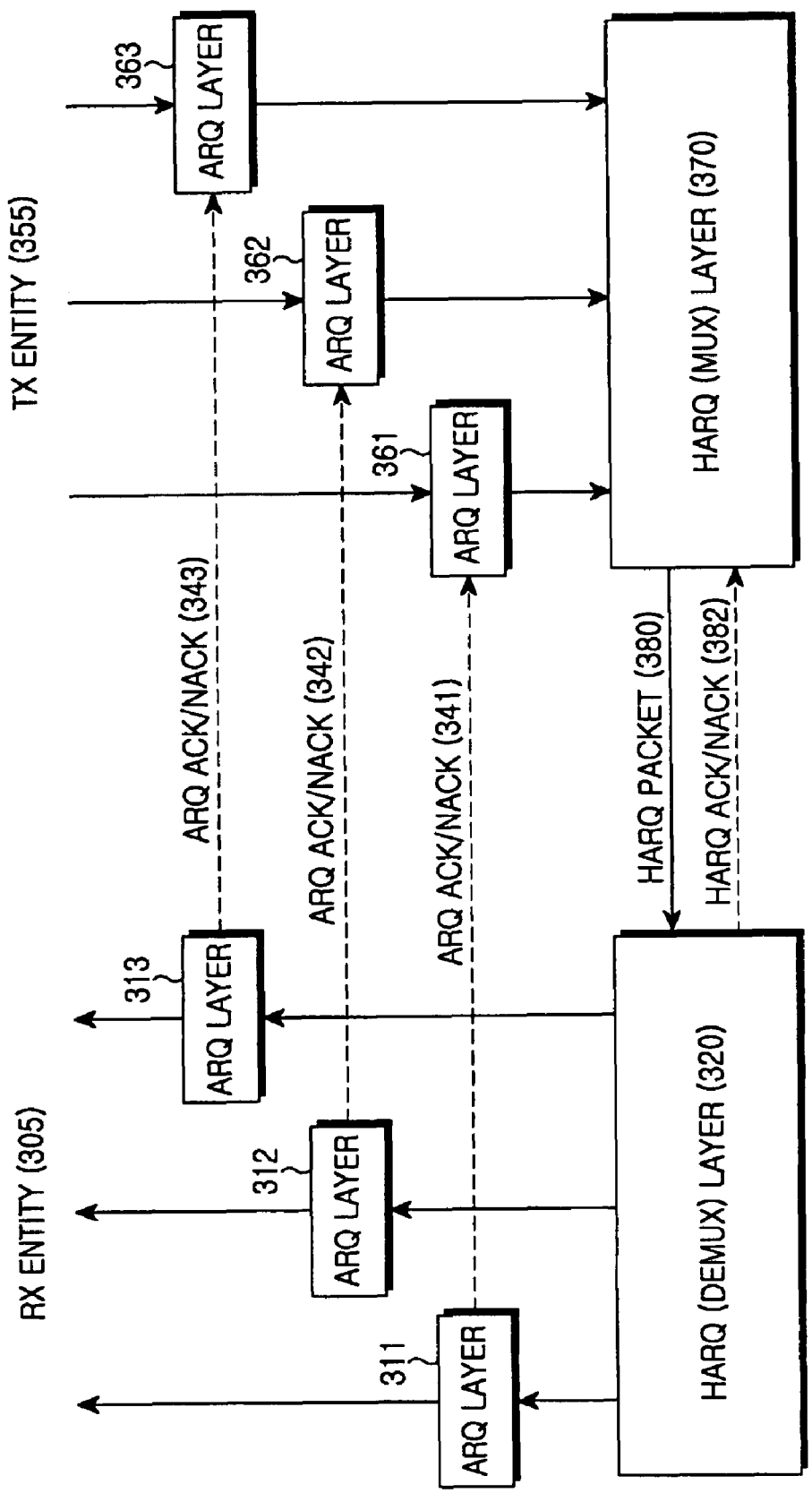
FIG. 3 is a diagram illustrating possible problems occurring when HARQ and ARQ operate independently according to the prior art.
Figure 4:
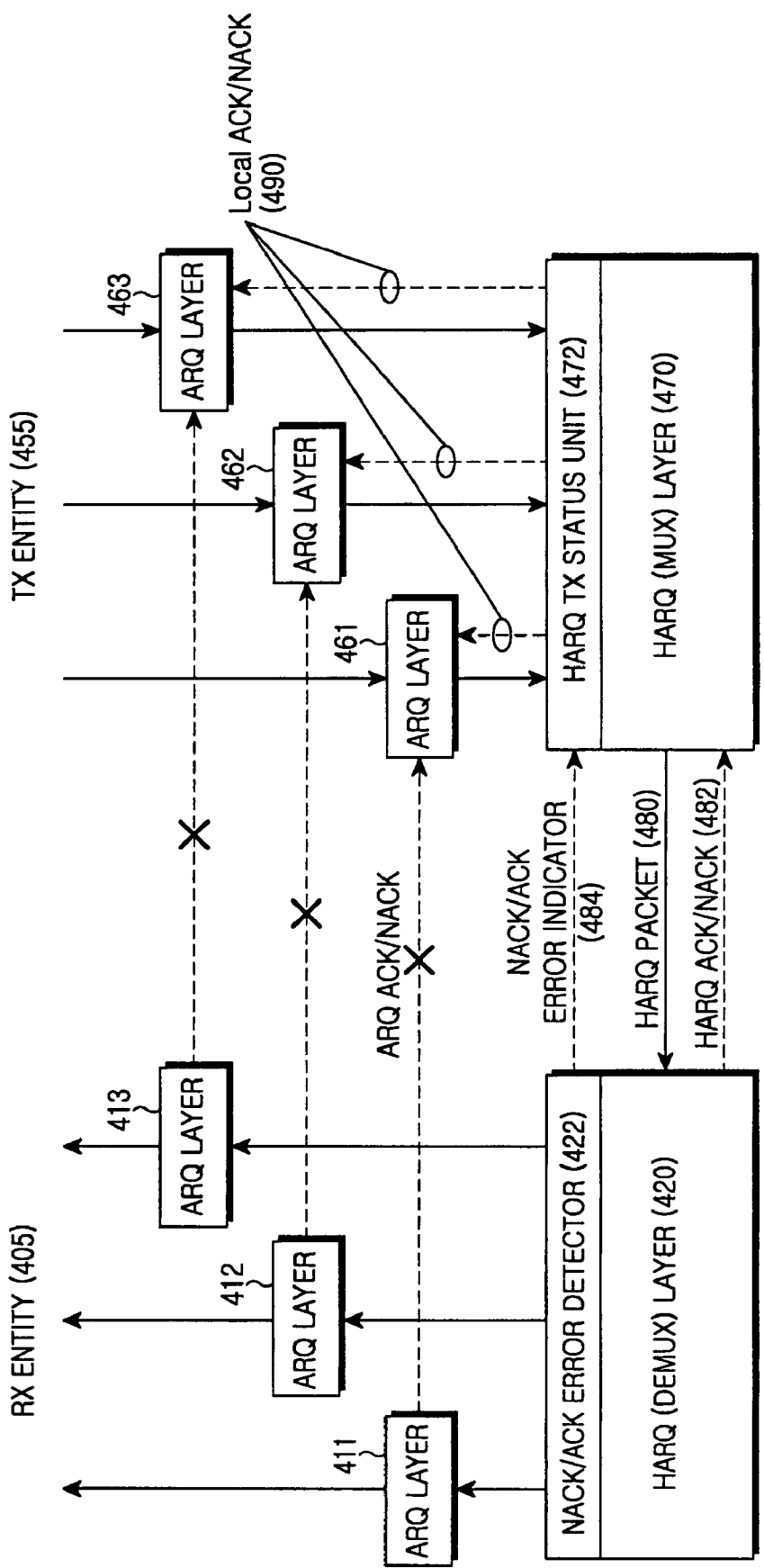
FIG. 4 is a diagram illustrating possible problems occurring when HARQ and ARQ operate in an interworking manner according to the prior art.
Figure 5:
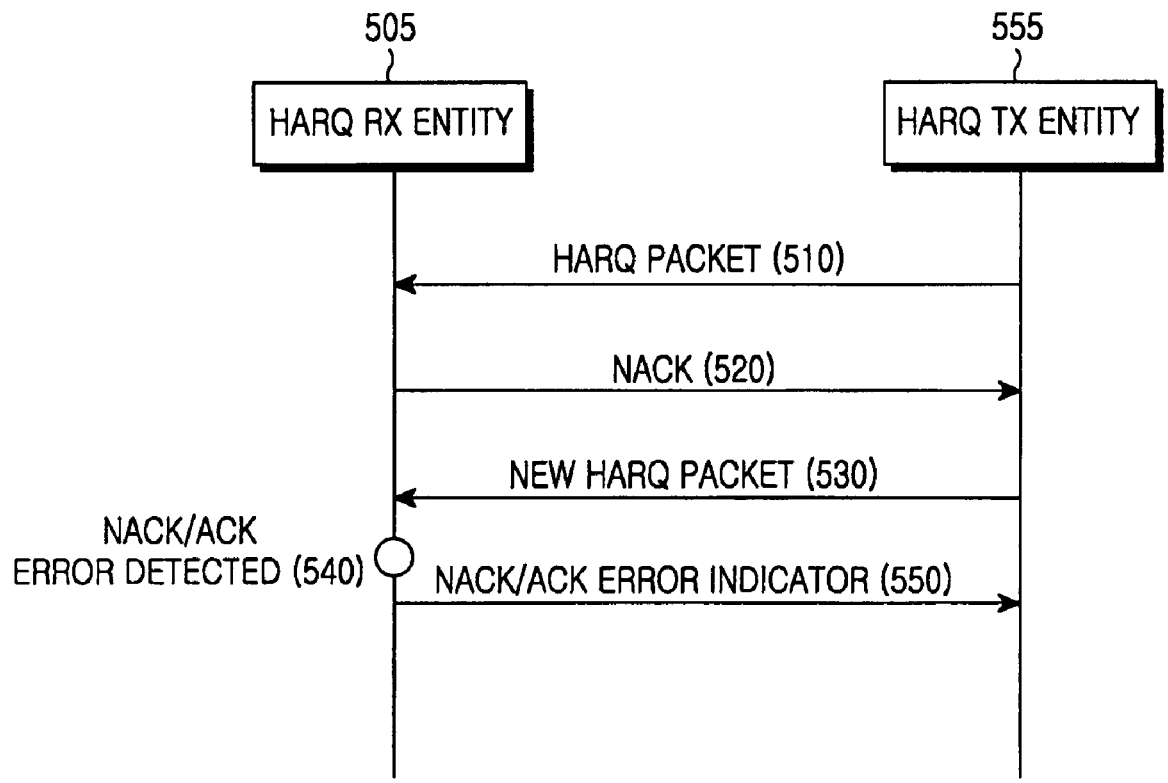
FIG. 5 is a diagram illustrating an operation of detecting a NACK/ACK error according to the prior art.
Figure 6:
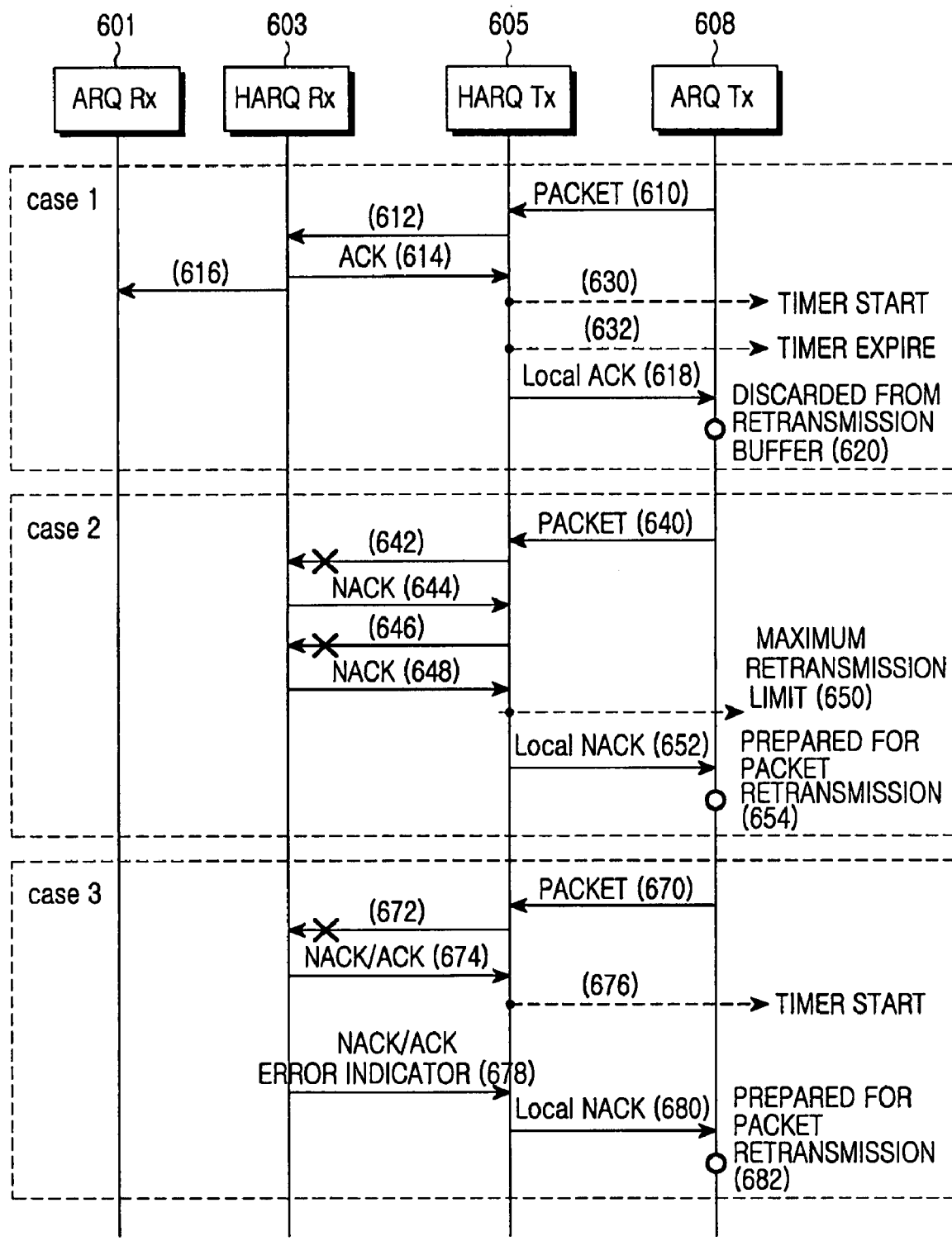
FIG. 6 is a diagram illustrating possible problems occurring when HARQ and ARQ operate according to the prior art.
Figure 7:
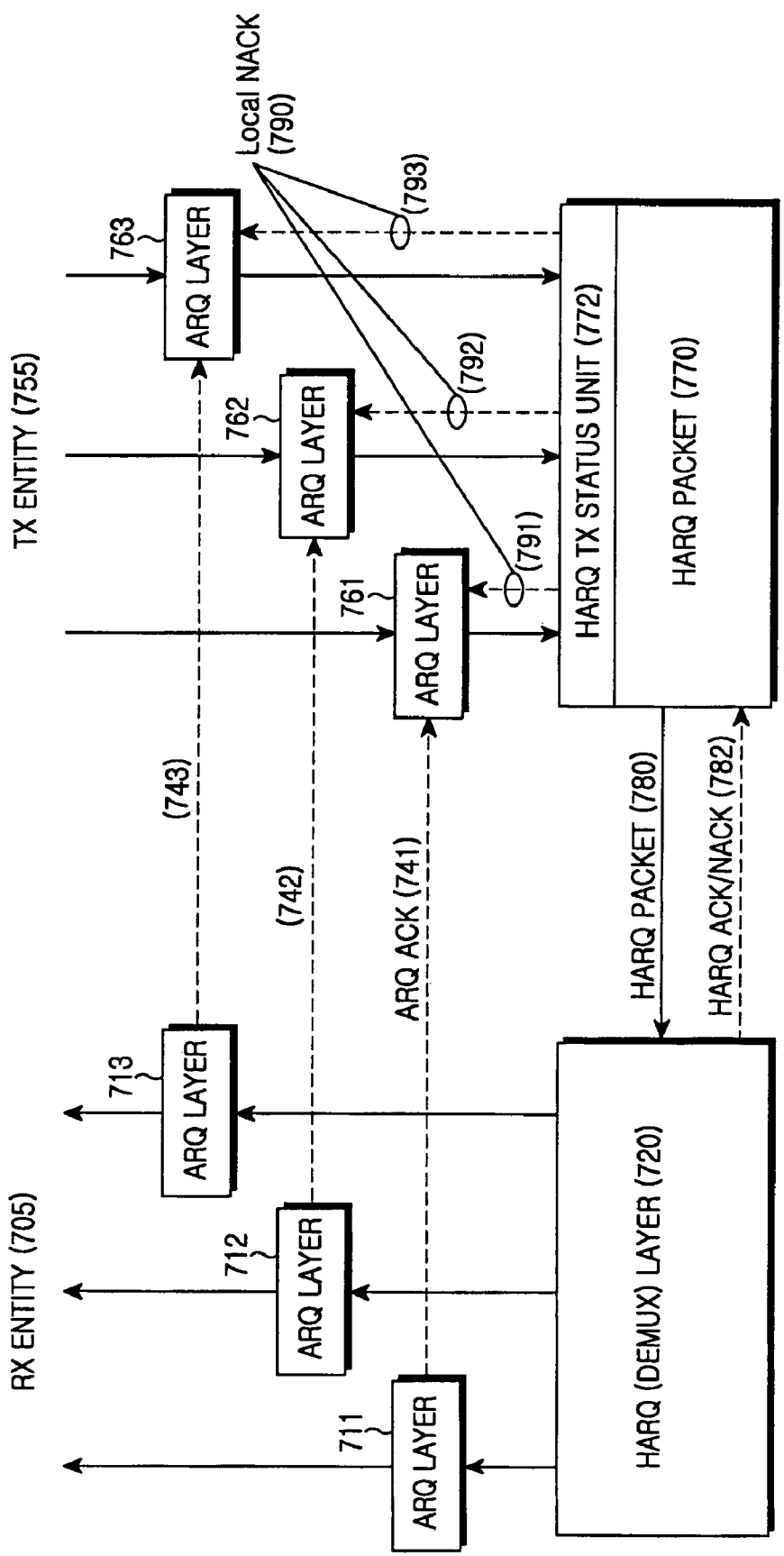
FIG. 7 is a diagram illustrating an operation of performing interworking between HARQ and ARQ according to the present invention.

FIG. 7 illustrates an operation of performing interworking between HARQ and ARQ according to the present invention.

Generally, when a Local ACK is used, a transmitting HARQ layer should always report the Local ACK to a transmitting ARQ layer for the successfully transmitted packet, causing a load to continuously exist between the HARQ layer and the ARQ layer. In addition, the HARQ layer needs an additional process for a HARQ NACK/ACK error. In order to solve this problem, the transmitting HARQ layer in the present invention sends only a Local NACK to an ARQ layer, and the HARQ NACK/ACK error is overcome with use of an ARQ ACK.

Referring to FIG. 7, a transmitting HARQ layer 770 sends a Local NACK, or transmission failure information, to transmitting ARQ layers 761, 762 and 763 so they may determine whether there is a need for retransmission of the corresponding packet.

More specifically, ARQ packets delivered from more than one ARQ layer 761, 762 and 763 are delivered to the transmitting HARQ layer 770. The transmitting HARQ layer 770 configures a HARQ packet in a size by multiplexing the ARQ packets. A HARQ packet can be configured with one ARQ packet or more than two ARQ packets. The HARQ layer 770 performs HARQ on an ARQ packet by ARQ packet basis. This is to minimize a delay due to the processing between the HARQ layer 770 and the ARQ layers 761, 762 and 763 by performing retransmission according to the ARQ packets. The transmitting HARQ layer 770 transmits the configured HARQ packet to a receiving HARQ layer 720 over a physical channel in step 780.

The receiving HARQ layer 720 demultiplexes the received HARQ packet, and delivers the demultiplexed ARQ packets to their corresponding ARQ layers 711, 712 and 713. The ARQ layers 711, 712 and 713 each perform error check on the received ARQ packets and deliver the results to the receiving HARQ layer 720. The receiving HARQ layer 720 sends a NACK signal to the transmitting HARQ layer 770 for the errored packet.

The transmitting HARQ layer 770, after performing retransmission according to a maximum retransmission limit value, reports a Local NACK to a corresponding one of the transmitting ARQ layers 761, 762 and 763, which processes the corresponding ARQ packet, if the number of retransmissions for the same packet exceeds the maximum retransmission limit value. Upon receipt of the Local NACK reported from the transmitting HARQ layer 770, the corresponding one of the transmitting ARQ layers 761, 762 and 763 prepares to retransmit the corresponding ARQ packet.

Regarding the HARQ operation, the receiving ARQ layers 711, 712 and 713 send an ACK to the transmitting ARQ layers 761, 762 and 763 only for the normally received ARQ packet in steps 741, 742 and 743, respectively. The ACK sent by the receiving layers 711, 712 and 713 include information on the normally accumulated packets to the transmitting ARQ layers 761, 762 and 763.

The HARQ layer 770 manages a HARQ transmission status table shown in Table 1. A block for managing the transmission status table can be the HARQ layer 770 itself, or a HARQ transmission status unit 772 can be separately provided, as shown in FIG. 7. The HARQ layers 770 and 720 each include one or more HARQ processors to perform a HARQ operation.

Table 1 shows a transmission status table that the HARQ transmission status unit 772 includes according to the present invention.

TABLE 1

| HARQ processor identifier (HARQ Processor ID) | ARQ packet ID (ARQ layer ID, ARQ packet sequence number) |
| --- | --- |

As shown in Table 1, the transmission status table stores mapping information between identifier information of a transmitting HARQ processor that has actually configured a HARQ packet, and information on the corresponding ARQ packet.

Based on the HARQ transmission status table, the transmitting HARQ layer 770 of the present invention can check a corresponding ARQ layer that has processed an ARQ packet, and a sequence number of the ARQ packet, and can also check an actually ACK-ed packet. Therefore, when configuring a HARQ packet using the transmission status table, the transmitting HARQ layer 770 indicates (or writes) information on an included ARQ packet in a HARQ transmission status table entry of the corresponding HARQ processor ID. After a transmission attempt, if the transmitting HARQ layer 770 receives a HARQ ACK, the transmitting HARQ layer 770 deletes a transmission status table entry for the corresponding HARQ frame (or corresponding processor ID). If the number of retransmissions reaches the maximum retransmission limit value according to the HARQ operation, or if the maximum retransmission limit has occurred, the transmitting HARQ layer 770 reports a Local NACK including a sequence number to a relevant ARQ layer referring to the transmission status table entry of the corresponding HARQ processor ID, and then deletes the transmission status table entry.

Figure 8:
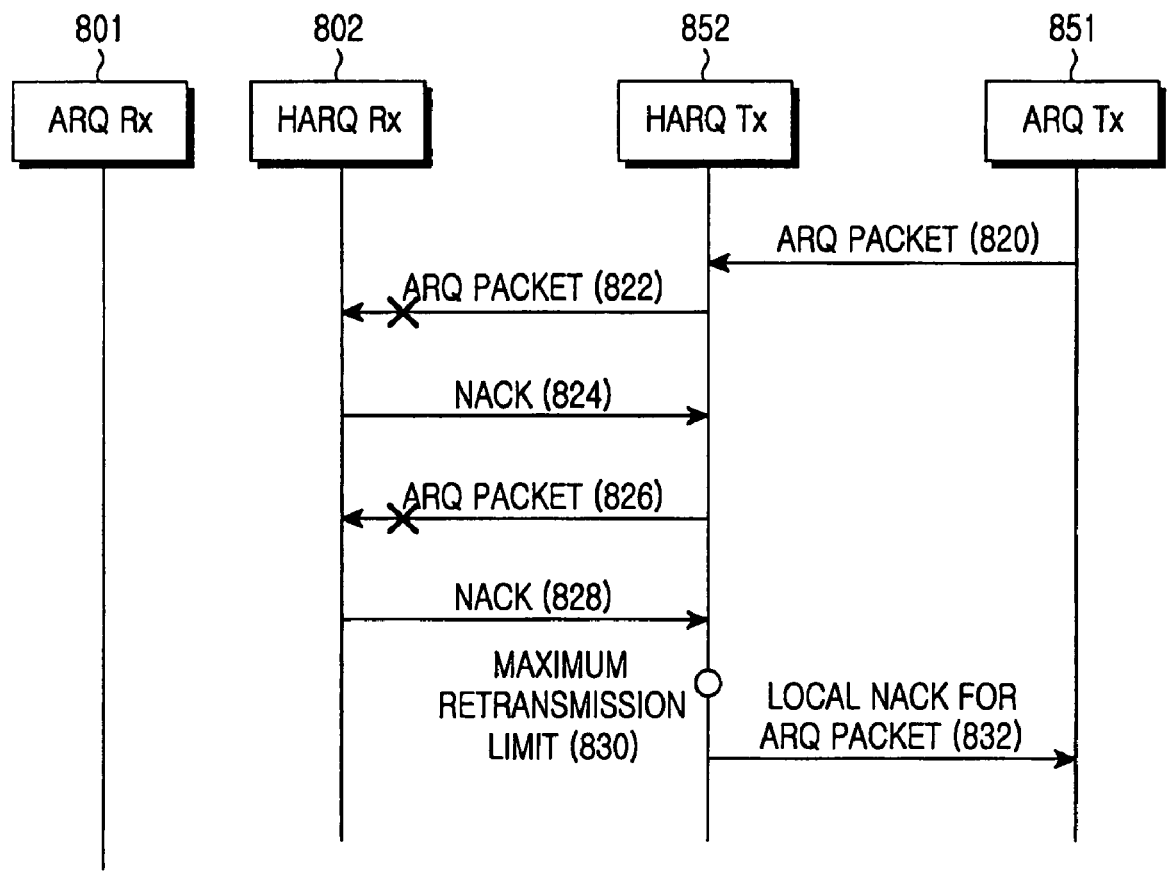
FIG. 8 is a diagram illustrating generation of a Local NACK according to the present invention.

FIG. 8 shows generation of a Local NACK according to the present invention. After framing an ARQ packet with the data delivered from an upper layer, a transmitting ARQ layer 851 delivers the ARQ packet to a transmitting HARQ layer 852 in step 820. In step 822, the transmitting HARQ layer 852 delivers the received ARQ packet to a receiving HARQ layer 802. That is, the HARQ layer 852 configures a HARQ packet with more than one ARQ packets delivered from the ARQ layer 851 and transmits the HARQ packet according to the present invention.

The receiving HARQ layer 802, after performing error check on the received HARQ packet, sends a NACK to the transmitting HARQ layer 852 due to occurrence of an error in step 824. In response, the transmitting HARQ layer 852 performs retransmission on the transmission-errored HARQ packet in step 826. The receiving HARQ layer 802 re-performs error check on the retransmitted HARQ packet, and then sends a NACK to the transmitting HARQ layer 852 in step 828.

In step 830, the HARQ layer 852 determines whether the number of retransmissions for the HARQ packet exceeds a maximum retransmission limit value. That is, the HARQ layer 852 determines the limited number of retransmissions for the NACK signal which is a response signal for the HARQ packet. When it is determined that the number of retransmissions for the HARQ packet exceeds the maximum retransmission limit value, the transmitting HARQ layer 852 reports, in step 832, generation of a NACK for the ARQ packet transmitted in step 820, to the transmitting ARQ layer 851, using a Local NACK.

The HARQ layer of the present invention performs error check on an initial ARQ packet, and sends a 'Local NACK for ARQ' to the ARQ layer as a response signal according to the error check result.

Therefore, the ARQ layer performs retransmission upon detecting the Local NACK reported from the HARQ layer. According to the present invention, the HARQ layer reports only a Local NACK for the transmission-failed ARQ packet, thereby contributing to a reduction in the processing load due to the use of a Local ACK. Also, compared with the prior art that performs retransmission after receipt of an ARQ NACK, the present invention secures fast and easy retransmission. In addition to transmission of the Local NACK, the present invention includes an operation of transmitting/receiving an ARQ ACK, as a precaution against occurrence of a HARQ NACK/ACK error. A description thereof will be made with reference to a first and second examples.

Figure 9A:
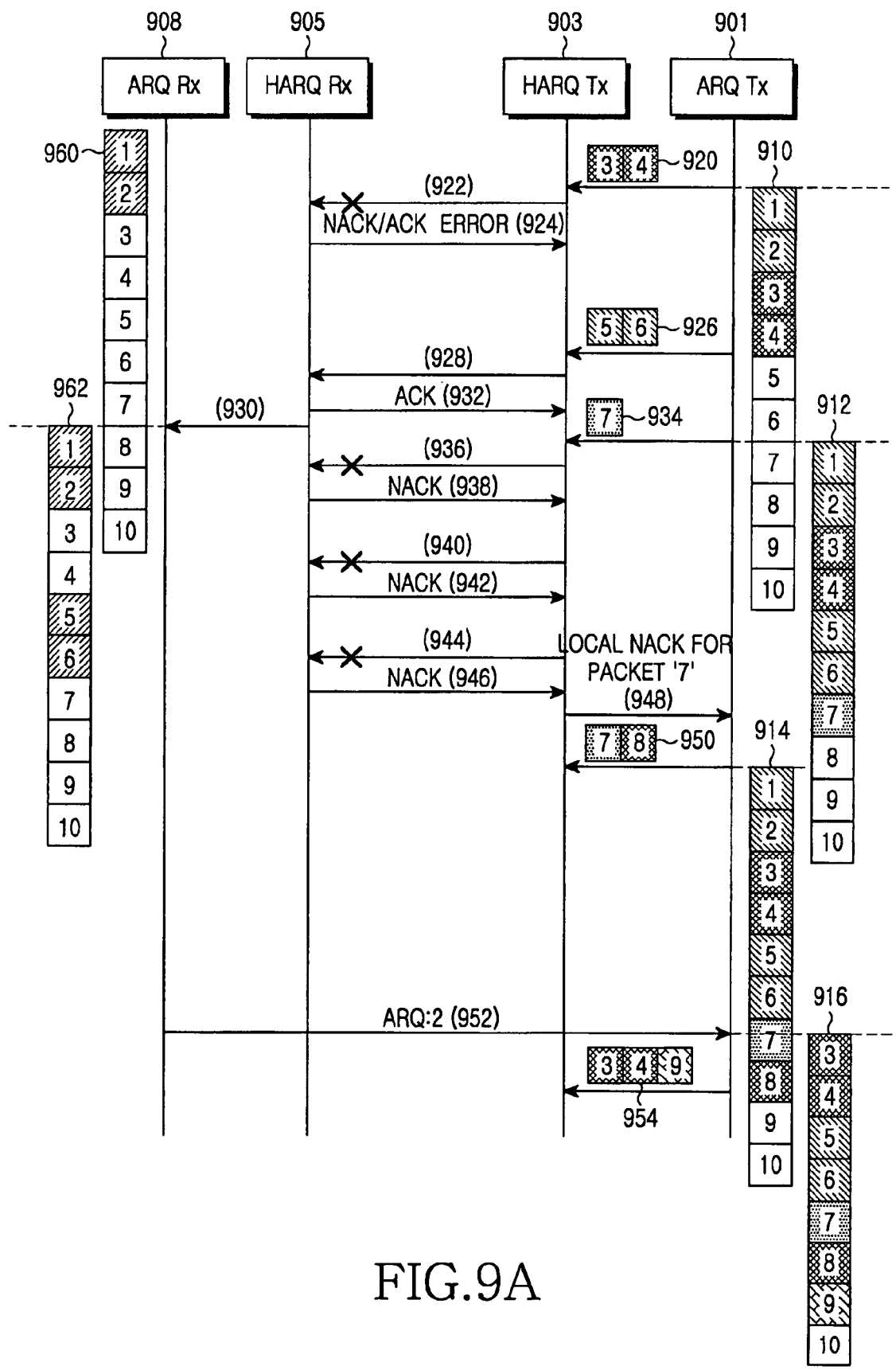
FIGS. 9A and 9B are diagrams illustrating an operation of HARQ/ARQ layers for transmitting/receiving an ACK signal according to a first embodiment of the present invention.
Figures 9B, 10:
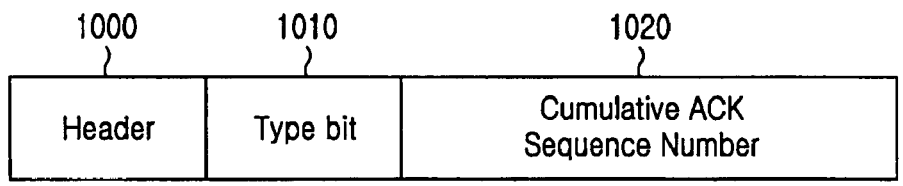
FIG. 10 is a diagram illustrating a format structure of an ACK signal according to the first embodiment of the present invention.

FIGS. 9A and 9B illustrate an operation of HARQ/ARQ layers for transmitting/receiving an ACK signal according to a first example of the present invention. For retransmission, a transmitting entity includes an ARQ layer 901 (ARQ Tx) and a HARQ layer 903 (HARQ Tx), and a receiving entity includes a HARQ layer 905 (HARQ Rx) and an ARQ layer 908 (ARQ Rx). Reference numerals 910, 912, 914 and 916 show retransmission buffer status and packet information table status of the transmitting entity, related to retransmission of an ARQ Tx, and reference numerals 960 and 962 show buffer status of the ARQ Tx in the receiving entity. A description of buffer status for each layer will now be made with reference to FIG. 9B.

In FIG. 9A, an ARQ Rx 908 has normally received the previously transmitted ARQ packets #1 and #2. This can be perceived using the receiving ARQ buffer 960.

In step 920, an ARQ Tx 901 transmits ARQ packets #3 and #4 to a HARQ Tx 903. In step 922, the HARQ Tx 903 forwards the ARQ packets #3 and #4 to a HARQ Rx 905. In step 924, the HARQ Rx 905 sends a NACK signal to the HARQ Tx 903, perceiving occurrence of an error in the ARQ packets #3 and #4. However, the NACK signal for the ARQ packets #3 and #4, which is a response signal being transmitted to the HARQ Tx 903, suffers an error that it changes to an ACK signal during transmission. Therefore, in step 926, the ARQ Tx 901 transmits ARQ packets #5 and #6 with the next sequence numbers to the HARQ Tx 903, determining that the ARQ packets #3 and #4 has normally been transmitted.

In step 928, the HARQ Tx 903 forwards the ARQ packets #5 and #6 to the HARQ Rx 905. In step 930, the HARQ Rx 905 performs an error check on the forwarded ARQ packets #5 and #6, and then forwards the ARQ packets #5 and #6 to the ARQ Rx 908 when no errors. A buffer status of the receiving ARQ Rx 908 is shown by reference numeral 962. Also, in step 932, the HARQ Rx 905 sends an ACK to the HARQ Tx 903 due to the normal receipt of the ARQ packets #5 and #6. The ACKs for the ARQ packets #5 and #6 have normally been transmitted to the HARQ Tx 903.

Therefore, in step 934, the ARQ Tx 901 delivers an ARQ packet #7 to the HARQ Tx 903. A buffer status of the transmitting ARQ Tx 901 is shown by reference numeral 912. In step 936, upon receipt of the ARQ packet #7, the HARQ Tx 903 forwards the ARQ packet #7 delivered from the ARQ Tx 901 to the HARQ Rx 905. The HARQ Rx 905 then performs an error check on the ARQ packet #7, and sends a NACK to the HARQ Tx 903 in step 938. Also, in step 940, the HARQ Tx 903 performs retransmission on the ARQ packet #7. If the HARQ Rx 905 detects occurrence of an error in the HARQ packet even after the retransmission, the HARQ Rx 905 resends a NACK to the HARQ Tx 903 in step 942. The retransmission of the ARQ packet #7 by the HARQ Tx 903 continues until the number of retransmissions reaches a maximum number of retransmissions, due to the occurrence of an error in the ARQ packet #7, in steps 944 and 946.

Determining that the number of retransmissions for the ARQ packet #7 has reached a maximum number of retransmissions, the HARQ Tx 903 reports occurrence of a Local NACK for the ARQ packet #7 to the ARQ Tx 901 in step 948.

In step 950, the ARQ Tx 901 transmits the ARQ packet #7 and its succeeding ARQ packet #8 to the HARQ Tx 903. At this point, a buffer status of the transmitting ARQ Tx 901 is shown by reference numeral 914.

According to the ARQ operation, the ARQ Rx 908 sends an ARQ ACK to the ARQ Tx 901 in step 952. As to the ARQ ACK, the ARQ Rx 908 sends an ACK with a sequence number for the consecutively received last packet, instead of sending ACKs for all received packets. Also, according to the present invention, the ARQ Rx 908 does not send NACKs for the missing ARQ packets. However, for the normally received ARQ packet, the ARQ Rx 908 sends an ARQ ACK, thereby allowing the ARQ Tx 901 performing retransmission in response to the Local NACK to guarantee reliable retransmission for the same ARQ packet.

In the present invention, the ARQ Tx 901 manages a HARQ packet configuration information table. This is because the HARQ Tx 903 performs HARQ on an ARQ packet by ARQ packet basis.

Because most retransmissions will be achieved in response to the Local NACK from the HARQ Tx 903, as described above, the ARQ Rx 908 sends a minimum number of ARQ ACKs for coping with a HARQ NACK/ACK error and for management of a retransmission buffer of the ARQ Tx 901. That is, instead of sending ACKs for all received packets, the ARQ Rx 908 sends an ACK including only a sequence number for the consecutively received last packet in the format provided by the present invention, and does not perform additional NACK transmission.

In this way, an ACK/NACK processing operation of the ARQ Tx 901 and the ARQ Rx 908 can be realized in a simple and efficient manner. Also, transmission/reception of the ARQ ACK/NACK is reduced, contributing to efficient use of the limited wireless resources. The ARQ Rx 908 separately sends an ACK used for management of a retransmission buffer and an ARQ ACK used at the occurrence of a missing ARQ packet.

If the HARQ Tx 903 has failed to receive an ARQ ACK even though the HARQ Tx 903 has attempted the retransmission as many times as the maximum number of retransmissions, the HARQ Tx 903 reports a Local NACK to the ARQ Tx 901. The ARQ Tx 901 attempts retransmission on the corresponding packets for which the Local NACK was reported from the HARQ Tx 903.

Referring to FIG. 9B, for ARQ packet generation, the ARQ Tx 901 manages a packet information table. The ARQ Tx 901 indicates the lowest sequence number among the sequence numbers of the ARQ packets constituting the same HARQ packet, in a 'First Sequence Number' field, and indicates sequence numbers of the other ARQ packets in a 'Sequence Number Information' field constituting the same HARQ packet. In this way, the ARQ Tx 901 separately defines the 'First Sequence Number' field and maintains descending arrangement during table update, thereby facilitating simple search for the retransmission packets.

For example, in step 920 of FIG. 9A, as the ARQ Tx 901 transmits the ARQ packets #3 and #4 to the HARQ Tx 903, the ARQ Tx 901, as shown by reference numeral 910, indicates, in the packet information table, information on the previously transmitted HARQ packets (including a packet #1 with initial sequence number and a packet #2 which is another packet in the same HARQ packet) and an initial sequence number as a packet #3, and indicates a sequence number in the same HARQ packet as a packet #4.

For the ARQ packet #7 that the ARQ Tx 901 transmitted in step 934, the ARQ Tx 901, as shown by reference numeral 912, indicates, in the packet information table, an initial sequence number as a packet #7, and indicates sequence number information with a Null field because there is no other packet during generation of the same HARQ packet. The field in which an initial sequence number is indicated as a packet #5 and a sequence number in the same HARQ packet is indicated as a packet #6 is previously updated with the packet information table for the ARQ packets #5 and #6 transmitted in step 926.

In step 950, as the ARQ Tx 901 receives a Local NACK for the packet #7 from the HARQ Tx 903, the retransmission buffer indicates the packet #7 to be retransmitted, with an initial sequence number, and the packet information table in which a sequence number in the same HARQ packet is indicated as a packet #8, is shown by reference numeral 914.

In step 954, as the ARQ Tx 901 receives an ACK including a consecutively received first sequence number from the ARQ Rx 908, the retransmission buffer includes a HARQ packet configuration information table shown by reference numeral 916. That is, the ARQ Tx 901 detects the occurrence of a HARQ NACK/ACK error, determining from the received ACK that the ARQ packet #3 is not in the course of retransmission. Therefore, by checking the ACK indicating the normal receipt of the packets #1 and #2, the ARQ Tx 901 includes a HARQ packet configuration information table made by deleting the packets #1 and #2 from the retransmission buffer.

That is, use of the ARQ ACK transmission of the present invention for solving the HARQ ACK/NACK error problem is effective for the radio protocol in which several ARQ initial transmission packets of the same layer can be included in the same HARQ packet. Also, use of the ARQ ACK transmission is effective for the radio protocol in which only one ARQ initial transmission packet of the same layer is included in the HARQ packet. In this case, there is no need to manage the HARQ packet configuration information table. This is because there is a need to make retransmission decision and perform retransmission only for an (ACK sequence number+ 1)$^{th}$ packet.

FIG. 10 illustrates a format structure of an ACK signal according to the first example of the present invention. When there is any missing ARQ packet, an ARQ Rx 908 inserts the highest sequence number among the sequence numbers of received packets in a 'Cumulative ACK Sequence Number' field 1020 of an ACK and then sends the ACK. Identifier information of a processor that has actually processed the ARQ packet can be inserted into a Header 1000. In addition, a Type Bit 1010, a field indicating presence/absence of any missing ARQ packet, is an optional bit that can be added or removed according to realization of the ACK. That is, when the Type Bit 1010 is set to '0' (Type Bit=0), the ARQ Rx 908 sends an ACK for management of a retransmission buffer in the transmitting ARQ layer. However, when the Type Bit 1010 is set to '1' (Type Bit=1), there is absence of any missing ACK packet.

Figure 11:
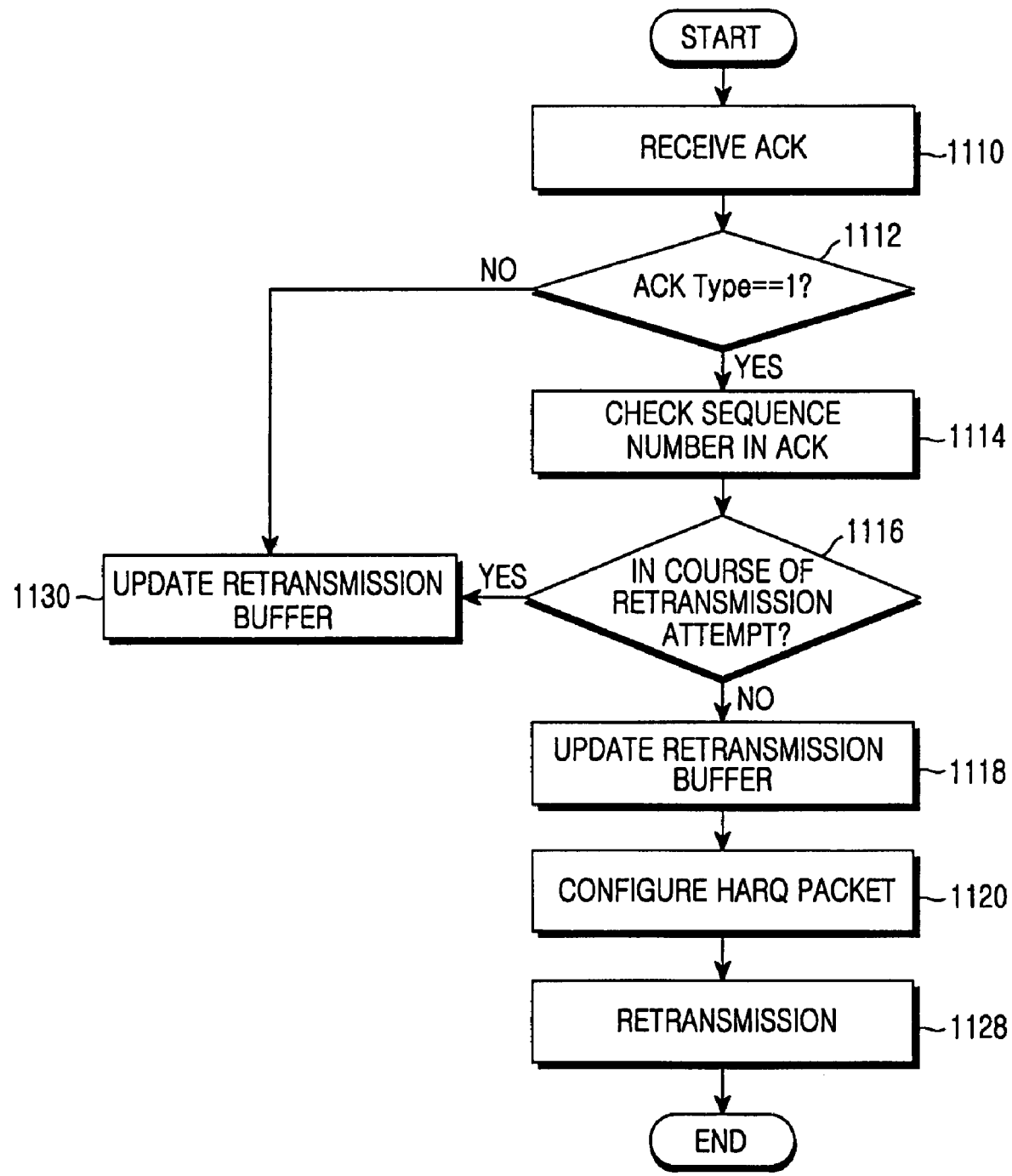
FIG. 11 is a diagram illustrating a process of receiving an ACK signal by a transmitting entity according to the first embodiment of the present invention.

FIG. 11 shows a process of receiving an ACK signal by a transmitting entity according to the first example of the present invention. In FIG. 11, an ARQ Tx receives an ACK from an ARQ Rx in step 1110, and determines in step 1112 whether an 'ACK Type' field is set to '1'. When the 'ACK Type' field is set to '1', there is a presence of any missing packet that the ARQ Tx has failed to receive from the ARQ Rx. When it is determined in step 1112 that the 'ACK Type' field is set to '1', the ARQ Tx checks a 'Cumulative ACK Sequence Number' field of the ACK in step 1114 to find the last sequence number among the sequence numbers of the consecutively received packets. Thereafter, in step 1116, the ARQ Tx determines whether an (ACK sequence number+1)$^{th}$ packet is in the course of its retransmission attempt.

When it is determined in step 1116 that the (ACK sequence number+1)$^{th}$ packet is not in the course of its retransmission attempt, the ARQ Tx updates, in step 1118, a retransmission buffer of the ARQ Tx by discarding all ARQ packets with sequence numbers succeeding the 'Cumulative ACK Sequence Number'. In step 1120, the ARQ Tx configures a HARQ packet and updates HARQ packet configuration information table taking the updated retransmission buffer into account, and then retransmits the corresponding ARQ packet in step 1128. The HARQ packet is equal to the ARQ packet.

However, when it is determined in step 1112 that the 'ACK Type' field is set to '0', the ARQ Tx proceeds to step 1130 where the ARQ Tx updates the retransmission buffer. When it is determined in step 1116 that the (ACK sequence number+1)$^{th}$ packet is in the course of its retransmission attempt, the ARQ Tx proceeds to step 1130 where it updates the retransmission buffer.

Although not illustrated in the drawing, upon receipt of a Local NACK from a HARQ Tx, the ARQ Tx configures the HARQ packet to retransmit the packet corresponding to the Local NACK, updates the HARQ packet configuration information table, and then performs retransmission on the ARQ packet corresponding to the Local NACK.

A description of a second example of the present invention will be made for a case where a transmitting entity sends an ACK along with information on an ARQ packet corresponding to a NACK.

Figure 12:
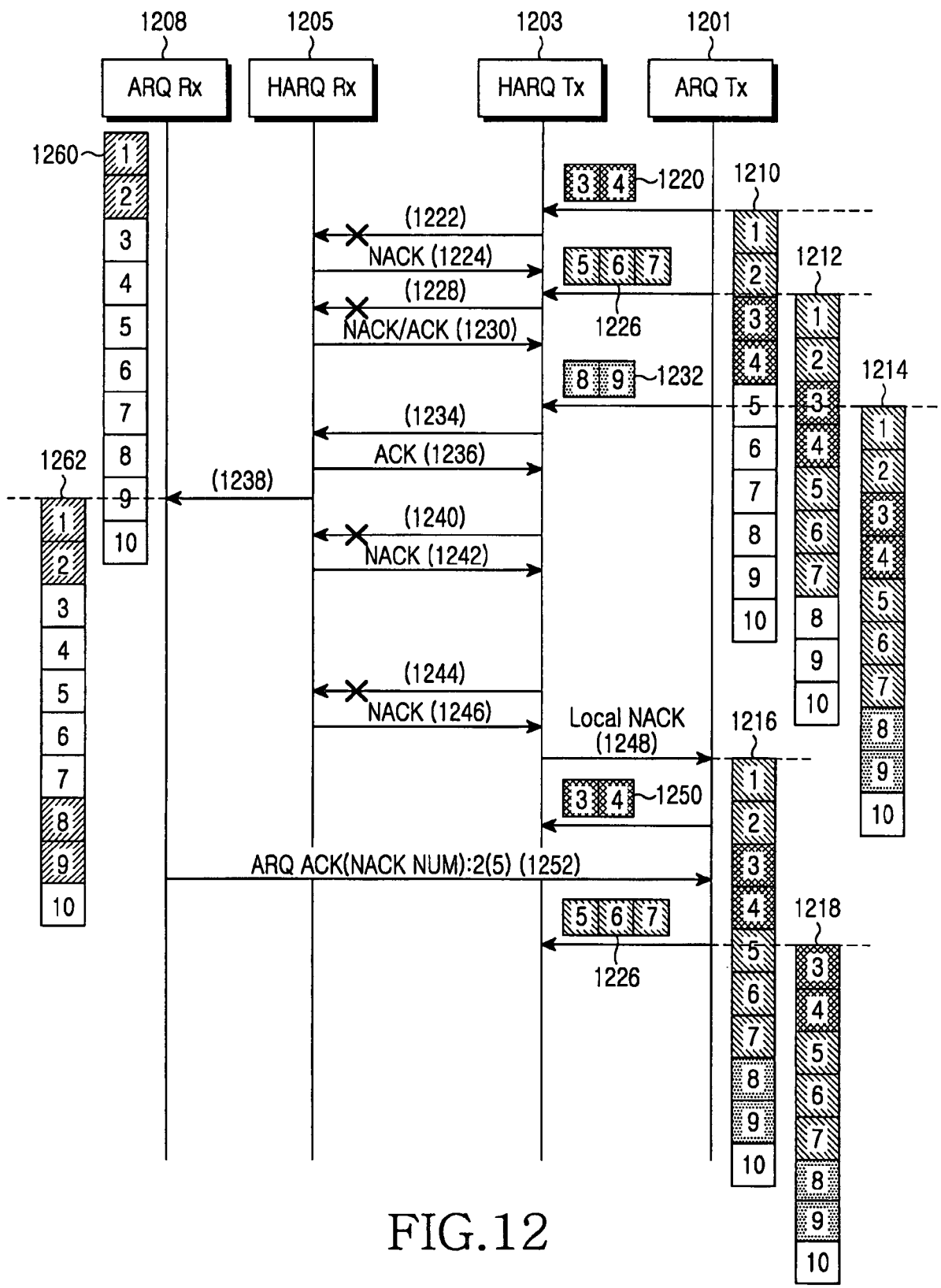
FIG. 12 is a diagram illustrating an operation of HARQ/ARQ layers for transmitting/receiving an ACK signal according to a second embodiment of the present invention.

FIG. 12 shows an operation of HARQ/ARQ layers for transmitting/receiving an ACK signal according to the second example of the present invention.

In FIG. 12, an ARQ Rx 1208 has normally received the previously transmitted ARQ packets #1 and #2. This can be perceived using a receiving ARQ buffer 1260.

In step 1220, an ARQ Tx 1201 transmits the ARQ packets #3 and #4 to a HARQ Tx 1203. In step 1222, the HARQ Tx 1203 forwards the ARQ packets #3 and #4 to a HARQ Rx 1205. The HARQ Rx 1205 sends a NACK signal to the HARQ Tx 1203 in step 1224, perceiving the occurrence of an error in the ARQ packets #3 and #4.

In step 1226, the ARQ Tx 1201 transmits ARQ packets #5, #6 and #7 to the HARQ Tx 1203. In step 1228, the HARQ Tx 1203 forwards the ARQ packets #5, #6 and #7 to the HARQ Rx 1205. Although the HARQ Rx 1205 has sent, in step 1230, a NACK signal to the HARQ Tx 1203 upon detecting the occurrence of an error in the ARQ packets #5, #6 and #7, an ARQ NACK/ACK error occurs.

In step 1232, the ARQ Tx 1201 transmits ARQ packets #8 and #9 to the HARQ Tx 1203. In step 1234, the HARQ Tx 1203 forwards the ARQ packets #8 and #9 to the HARQ Rx 1205. The HARQ Rx 1205 sends an ACK signal to the HARQ Tx 1203 in step 1236, perceiving the normal receipt of the ARQ packets #8 and #9. Also, in step 1238, the HARQ Rx 1205 forwards the ARQ packets #8 and #9 to the ARQ Rx 1208. The ARQ Rx 1208 updates and manages a reception buffer for the normally received packets #1, #2, #8 and #9.

In step 1240, the HARQ Tx 1203 retransmits the ARQ packets #3 and #4 to the HARQ Rx 1205. The HARQ Rx 1205 sends a NACK signal to the HARQ Tx 1203 in step 1242, detecting the occurrence of an error even in the retransmitted ARQ packets #3 and #4. In step 1244, the HARQ Tx 1203 retransmits the ARQ packets #3 and #4 to the HARQ Rx 1205.

As a result, the HARQ Tx 1203 reports in step 1248 the occurrence of a Local NACK for the ARQ packets #3 and #4 to the ARQ Tx 1201. In step 1250, the ARQ Tx 1201 performs retransmission on the ARQ packets #3 and #4 after checking the retransmission buffer.

In step 1252, the ARQ Tx 1201 receives an ARQ ACK from the ARQ Rx 1208. The ARQ ACK is an ACK including a sequence number of the consecutively received last packet, and information on the number of missing packets during the consecutive reception.

Therefore, in step 1226, the ARQ Tx 1201 performs retransmission on the ARQ packets #3, #4, #5, #6 and #7, because it recognizes from the ACK that the consecutively received last packet is the ARQ packet #2 and the number of consecutive missing packets is 5. However, because the ARQ packets #3 and #4 are in the course of retransmission in response to the Local NACK, the ARQ Tx 1201 disregards information on the ARQ packets #3 and #4 and performs retransmission on the ARQ packets #5, #6 and #7, determining the occurrence of a HARQ ACK/NACK error in the ARQ packets #5, #6 and #7.

In the second example, the ARQ Tx 1201 does not manage a HARQ packet configuration information table. That is, the ARQ Tx 1201 determines occurrence of a HARQ ACK/NACK error depending on the number of missing packets included in the ACK, i.e. depending on NACK information of missing packets. When it is determined that a HARQ ACK/NACK error has occurred, the ARQ Tx 1201 performs retransmission on the consecutive missing ARQ packets whose sequence numbers succeed the sequence number of the normally received packet in the ACK, so there is no need to separately manage the HARQ packet configuration information table.

Figure 13:
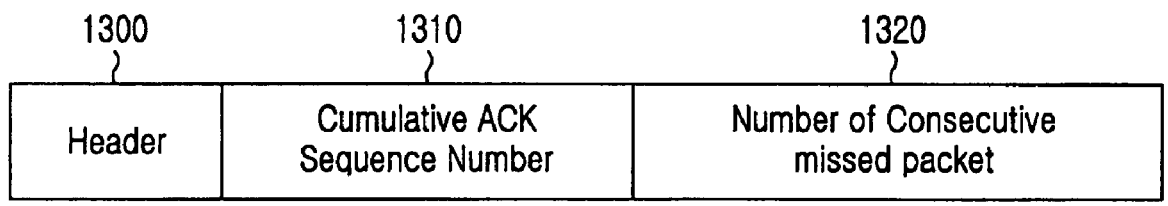
FIG. 13 is a diagram illustrating a format structure of an ACK signal according to the second embodiment of the present invention.

FIG. 13 shows a format structure of an ACK signal according to the second embodiment of the present invention. In FIG. 13, when there is any missing ARQ packet, an ARQ Rx inserts the highest sequence number among the sequence numbers of the received packets into a 'Cumulative ACK Sequence Number' field 1310 of an ACK, and then sends the ACK. Identifier information of a processor that has actually processed the ARQ packet can be inserted into a Header 1300. The ACK is configured so the total number of consecutive missing packets, whose sequence numbers succeed the sequence number of the consecutively received last packet, is included in a 'Number of Consecutive missed packet' field 1320.

In other words, the ARQ Tx 1201 allocates the number of consecutive missing ARQ packets whose sequence numbers succeed the last sequence number in the ACK in the 'Number of Consecutive missed packet' field, before transmission of the ACK, and the 'Number of Consecutive missed packet' field can be separately transmitted with an ACK used for management of the retransmission buffer and an ACK used at the occurrence of a missing ARQ packet. That is, the ACK is classified into an ACK with 'Number of Consecutive missed packet' field='0' and an ACK with 'Number of Consecutive missed packet' field='1'. The ACK with 'Number of Consecutive missed packet' field='0' means absence of missing ARQ packets, and can be regarded as an ACK used for management of the retransmission buffer.

Figure 14:
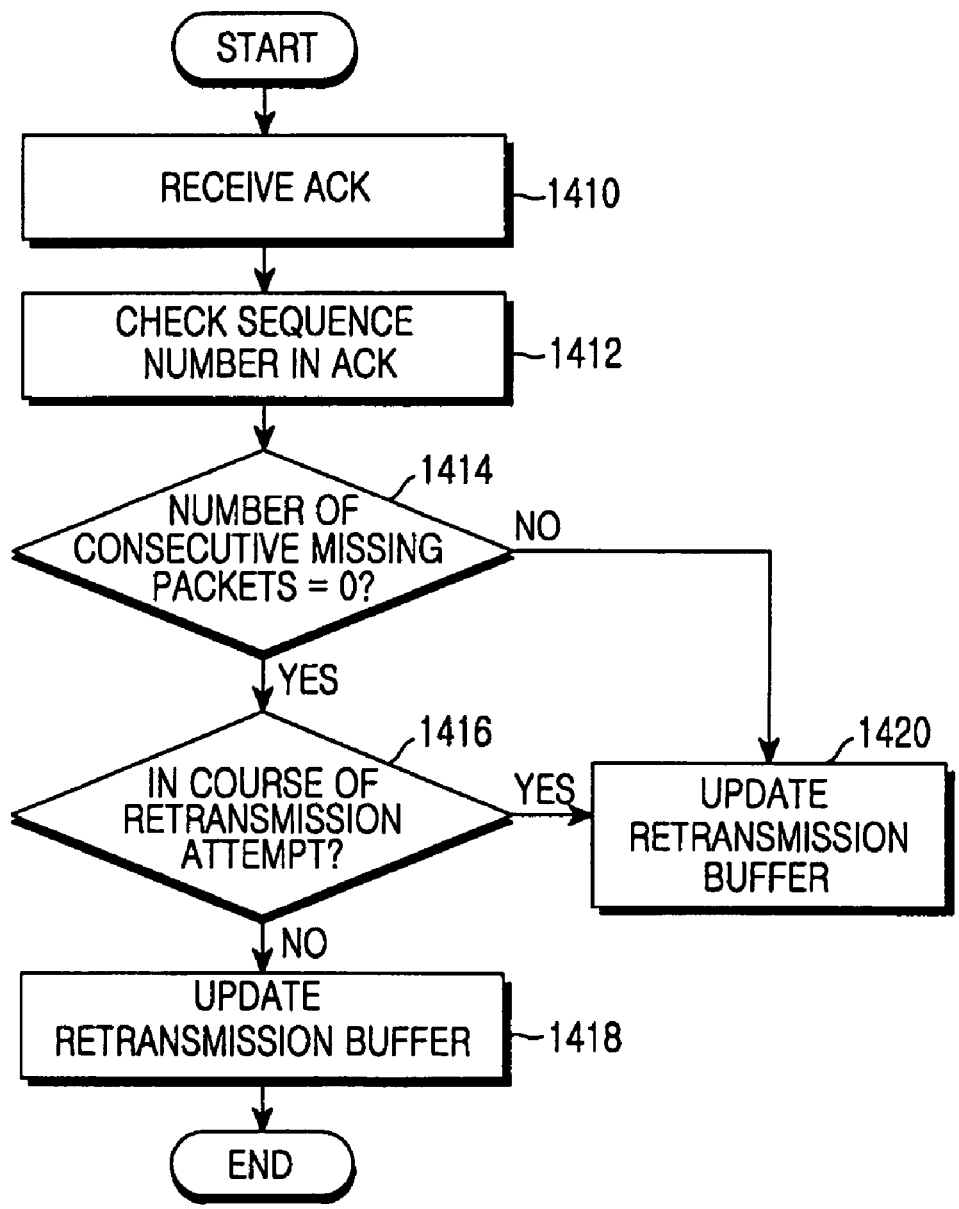
FIG. 14 is a diagram illustrating a process of receiving an ACK signal by a transmitting entity according to the second embodiment of the present invention.

FIG. 14 shows a process of receiving an ACK signal by a transmitting entity according to the second example of the present invention. In FIG. 14, an ARQ Tx receives an ACK from an ARQ Rx in step 1410, and checks a 'Cumulative ACK Sequence Number' field of the ACK in step 1412 to find the last sequence number among the sequence numbers of the consecutively received packets. Thereafter, the ARQ Tx checks a 'Number of Consecutive missed packet' field in step 1414 to determine whether the number of consecutive missing packets whose sequence numbers follow the sequence number of the consecutively received last packet is '0'. When it is determined in step 1414 that the number of missing packets is not '0', the ARQ Tx determines, in step 1416, whether there is any packet, which is in the course of retransmission attempt in response to a Local NACK report, among the missing packets. When it is determined that there is no missing packet in the course of retransmission, the ARQ Tx proceeds to step 1418 where it performs retransmission on the missing packets in order of the sequence number. At this time, the ARQ Tx updates the retransmission buffer and performs retransmission. For example, in FIG. 12, the sequence number of the consecutively received last packet is 2, and the total number of missing packets is 5. At this time, the packets #3 and #4 are in the course of retransmission due to the Local NACK. Therefore, the ARQ Tx performs retransmission on the packets #5, #6 and #7, disregarding the packets #3 and #4 which are in the course of its retransmission attempt. However, when there is no packet in the course of retransmission, the ARQ Tx performs retransmission on the missing packets in order of packets #3, #4 and #5.

However, when it is determined in step 1414 that the 'Number of Consecutive missed packet' field is set to '0', the ARQ Tx updates the retransmission buffer in step 1420, considering that the ACK is an ACK used for updating the retransmission buffer.

Although not illustrated in the drawing, upon receipt of a Local NACK from a HARQ Tx, the ARQ Tx configures a HARQ packet including the corresponding retransmission ARQ packet to retransmit the packet corresponding to the Local NACK, and then performs retransmission on the ARQ packet corresponding to the Local NACK. For example, this can be regarded as a process in which upon receipt of the Local NACK report, the ARQ Tx updates the retransmission buffer for retransmission of the packets #3 and #4, and then retransmits the packets #3 and #4.

As described above, the ARQ Tx according to the second example of the present invention receives from the ARQ Rx an ACK including sequence number information of the normally received last packet and information on the total number of missing packets, so the ARQ Tx has no need to manage a separate HARQ packet configuration information table for retransmission.

Figure 15:
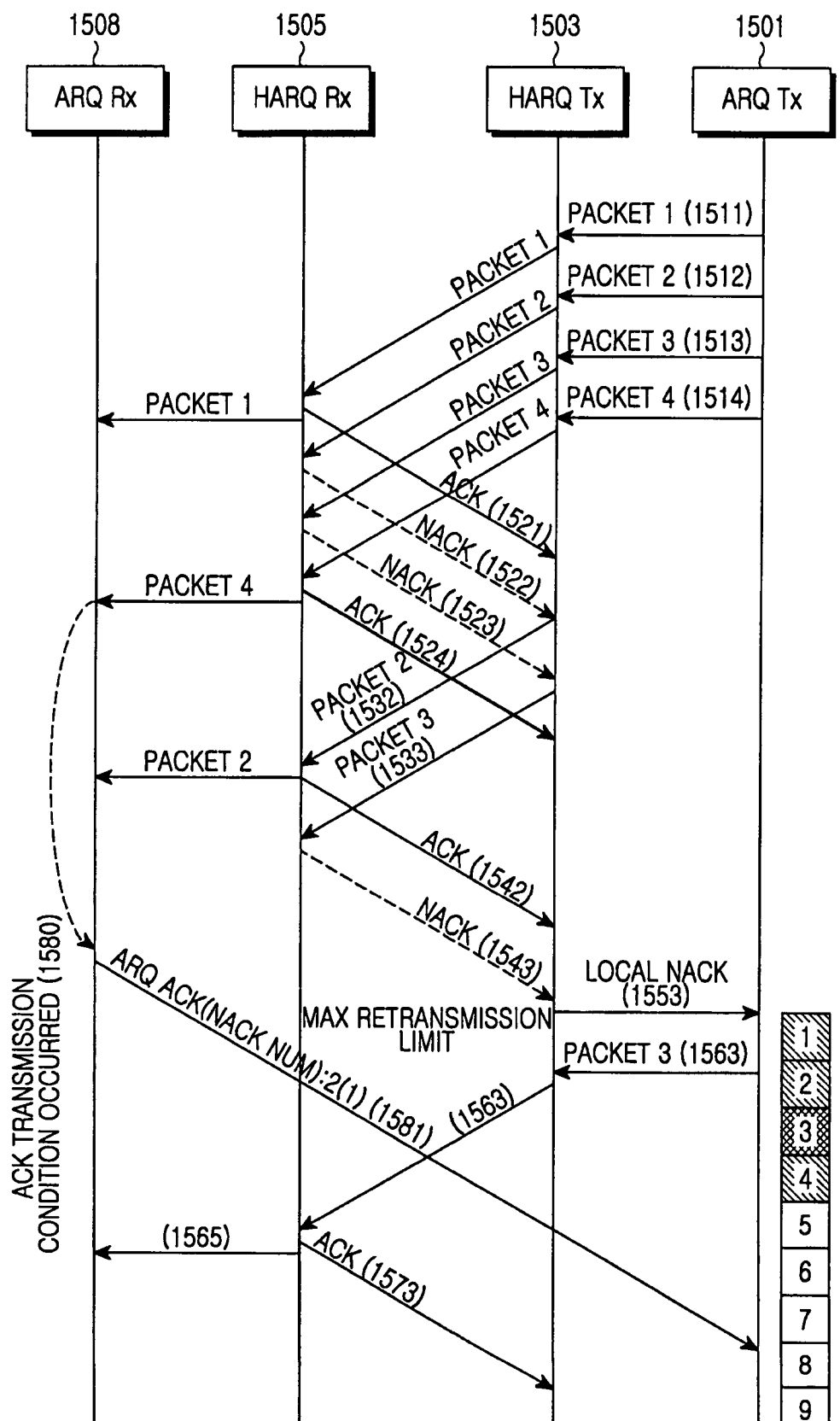
FIG. 15 is a diagram illustrating an operation for preventing repeated transmission between HARQ and ARQ according to the present invention.

FIG. 15 shows an operation for preventing repeated transmission according to the present invention, and FIGS. 16A to 16D show examples of a HARQ transmission status table for prevention of repeated transmission according to the present invention.

In FIG. 15, an ARQ Tx 1501 sequentially delivers ARQ packets #1, #2, #3 and #4 to a HARQ Tx 1503 steps 1511, 1512, 1513 and 1514, respectively. The HARQ Tx 1503, as shown in FIG. 7, includes a HARQ transmission status unit 772. The HARQ transmission status unit 772 manages a HARQ transmission status table shown in FIG. 16A so as to report a Local NACK to each of ARQ layers 761,762 and 763. The number of the HARQ processors is assumed to be four here, and only one ARQ entity operates.

After step 1514, the HARQ Tx 1503 manages the HARQ transmission status table shown in FIG. 16A. The ARQ packets #1, #2, #3 and #4 are transmitted to a HARQ Rx 1505 over a wireless channel in steps 1511, 1512, 1513 and 1514, respectively. The HARQ Rx 1505 performs error check on the received ARQ packets #1, #2, #3 and #4, and then sends response signals to the HARQ Tx 1503. For example, the HARQ Rx 1505 sends to the HARQ Tx 1503 an ACK 1521 for a normally received ARQ packet #1, a NACK 1522 for a reception-failed (missing) ARQ packet #2, a NACK 1523 for a missing ARQ packet #3, and an ACK 1524 for a normally received ARQ packet #4.

After step 1524, the HARQ Tx 1503 deletes the ACK-ed packets from the HARQ transmission status table, and manages a new HARQ transmission status table shown in FIG. 16B.

The HARQ Rx 1505, as it has normally received the ARQ packet #1 and the ARQ packet #4, forwards the ARQ packet #1 and the ARQ packet #4 to an ARQ Rx 1508. The ARQ Rx 1508 then sends ARQ ACKs for the normally received packets to the ARQ Tx 1501 after a lapse of a time. This is to secure the maximum reliability by the ARQ operation and HARQ operation.

However, in response to the NACK signals 1522 and 1523 received from the HARQ Rx 1505, the HARQ Tx 1503 retransmits the ARQ packet #2 and the ARQ packet #3 in steps 1532 and 1533, respectively, and the HARQ Rx 1505 performs an error check on the retransmitted ARQ packets #2 and #3. The HARQ Rx 1505 sends an ACK signal to the HARQ Tx 1503 in step 1542, perceiving the normal receipt of the ARQ packet #2, and forwards the normally received ARQ packet #2 to the ARQ Rx 1508. However, for the ARQ packet #3 in which there is an error, the HARQ Rx 1505 sends a NACK signal to the HARQ Tx 1503 in step 1543.

Upon receipt of a NACK for the ARQ packet #3, the HARQ Tx 1503 determines whether the number of retransmissions for the ARQ packet #3 exceeds a maximum retransmission limit value. When the number of retransmissions for the ARQ packet #3 exceeds the maximum retransmission limit value, the HARQ Tx 1503 generates a Local NACK and reports the NACK for the ARQ packet #3 to the ARQ Tx 1501 in step 1553. Thereafter, because the Local NACK-ed packet is also deleted from the HARQ transmission status table, the HARQ Tx 1503 manages a new HARQ transmission status table shown in FIG. 16C.

The ARQ Tx 1501 performs retransmission on the ARQ packet #3 in response to the Local NACK 1553 in step 1563. The HARQ Tx 1503 manages a new HARQ transmission status table shown in FIG. 16D.

The HARQ Tx 1503 retransmits the ARQ packet #3 to the HARQ Rx 1505 over a wireless channel in step 1563. The HARQ Rx 1505 performs error check on the retransmitted ARQ packet #3, and when it is determined that there is no error, the HARQ e Rx 1505 forwards the normally received ARQ packet #3 to the ARQ Rx 1508 in step 1565. In addition, the HARQ Rx 1505 sends an ACK to the HARQ Tx 1503 in step 1573, to report the normal receipt of the ARQ packet #3.

Unlike in the HARQ operation, the ARQ Rx 1508 senses in step 1580 that the transmission of the ARQ packet #3 has not been completed for the time. Therefore, the ARQ Rx 1508 sends, in step 1581, an ARQ ACK to the ARQ Tx 1501 indicating that the consecutively received last packet is the ARQ packet #2 and the number of consecutive missing packets is 1. That is, the ARQ Rx 1508 sends to the transmitting ARQ Tx 1501 the ARQ ACK used for performing retransmission on the missing ARQ packet #3 that was missing in step 1580.

However, the ARQ packet #3 is in the course of retransmission attempt in response to the Local NACK as described in steps 1553 and 1563. In this case, the ARQ Tx 1501 should not attempt retransmission for the ARQ packet #3.

For example, in the case of FIG. 15, because the ARQ Tx 1501 has already transmitted the ARQ packet #3 with the HARQ ACK 1573 in step 1563, the retransmission by the ARQ Tx 1501 has been completed, so the retransmission is not performed. In this regard, the ARQ Tx 1501 can determine that the HARQ Tx 1503 is attempting retransmission for the ARQ packet #3, because it is noted from the HARQ transmission status table of FIG. 16D that the ARQ Tx 1501 has not yet received the HARQ ACK 1573. Therefore, the ARQ Tx 1501 can prevent repeated transmission for the same ARQ packet #3 by avoiding making the ARQ retransmission attempt.

In other words, the ARQ Tx 1501, when determining retransmission for an ARQ ACK in step 1581, determines whether the ARQ Tx 1501 is preparing for retransmission depending on the Local NACK from the corresponding HARQ Tx 1503 or on the previously received ARQ ACK, and when the ARQ Tx 1501 is not preparing for retransmission, the ARQ Tx 1501 determines whether the HARQ Tx 1503 is performing retransmission on the corresponding packet depending on the HARQ transmission status table. That is, the ARQ Tx 1501 finally determines to make an ARQ retransmission attempt only when the HARQ Tx 1503 does not perform retransmission on the corresponding packet.

As is apparent from the foregoing description, in a mobile communication system performing HARQ according to the present invention, the HARQ Tx sends only a Local NACK and the ARQ Rx sends only an ACK including the last sequence number among the sequence numbers of the normally received packets to reduce a processing load between the HARQ operation and the ARQ operation, thereby contributing to improvement in the entire system performance. That is, the system can perform the ARQ and HARQ operations rapidly, thereby servicing high-speed data with improved efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for retransmitting high-speed packet data in a transmission apparatus of a mobile communication system that simultaneously performs an Automatic Retransmission reQuest (ARQ) that retransmits an ARQ packet reconfigured by allocating a sequence number to data delivered from an upper layer, and a Hybrid Automatic Retransmission reQuest (HARQ) that multiplexes a plurality of ARQ packets into one HARQ packet and performs repeated retransmission on the HARQ packet within a maximum retransmission limit value, the method comprising:

checking, by a transmitting HARQ entity, a missing ARQ packet and sending a Negative Acknowledgement (NACK) for the missing ARQ packet to a transmitting ARQ entity;

receiving, by the transmitting ARQ entity, an Acknowledged (ACK) for ARQ packets from a receiving ARQ entity; and detecting, by the transmitting ARQ entity, at least one missing ARQ packet according to the NACK and the ACK, configuring a retransmission packet with the detected ARQ packet, and retransmitting the retransmission packet.

2. The method of claim 1, wherein the transmitting HARQ entity performs HARQ on an ARQ packet by ARQ packet basis.

3. The method of claim 1, wherein the ACK includes a last sequence number among sequence numbers of normally transmitted consecutive ARQ packets, and identifier information of a corresponding ARQ entity that has processed the ARQ packets.

4. The method of claim 3, wherein the ACK further includes a type bit indicating presence/absence of a missing packet.

5. The method of claim 3, wherein the ACK further includes information indicating a number of missing packets.

6. The method of claim 1, wherein the sending of a NACK comprises:

sending a NACK to the transmitting ARQ entity when a number of retransmissions performed by the transmitting HARQ entity exceeds the maximum retransmission limit value.

7. The method of claim 1, wherein the sending of a NACK comprises:

receiving a NACK for an ARQ packet from a receiving HARQ entity and forwarding the NACK to the transmitting ARQ entity.

8. The method of claim 3, wherein the configuring and retransmitting of a retransmission packet comprises:

checking from the ACK a last sequence number among sequence numbers of normally received packets;

determining a next packet with a sequence number succeeding the last sequence number is in a course of retransmission by the transmitting HARQ entity; and when the next packet is not in a course of retransmission, configuring a retransmission packet including the next packet, and retransmitting the retransmission packet.

9. The method of claim 3, wherein the configuring and retransmitting of a retransmission packet comprises:

checking missing ARQ packets depending on the ACK and the NACK, and updating a retransmission buffer so a lowest sequence number among sequence numbers of the missing ARQ packets is allocated in a 'First Sequence Number' field and sequence numbers succeeding the lowest sequence number are allocated in a configuration field; and performing retransmission by transmitting a desired retransmission packet to the transmitting HARQ entity according to the updated retransmission buffer.

10. The method of claim 4, wherein the configuring and retransmitting of a retransmission packet comprises:

receiving from the receiving ARQ entity the ACK including a last sequence number among sequence numbers of normally received packets and a number of missing packets;

checking from the ACK the last sequence number among the sequence numbers of the normally received packets;

determining whether a next packet with a sequence number succeeding the last sequence number is in a course of retransmission; and when the next packet is not in a course of retransmission, configuring a retransmission packet including the next packet, and retransmitting the retransmission packet to the transmitting HARQ entity.

11. A method for retransmitting high-speed packet data in a mobile communication system including an Hybrid Automatic Retransmission reQuest (HARQ) entity that restores a plurality of Automatic Retransmission reQuest (ARQ) packets by demultiplexing a HARQ packet received from a lower layer, and an ARQ entity that reconfigures the received ARQ packets into an original upper layer packet and then delivers the upper layer packet to an upper layer, the method comprising:

sending, by a receiving HARQ entity, a Negative Acknowledgement (NACK) for a missing ARQ packet to a transmitting HARQ entity;

sending, by a receiving ARQ entity, an Acknowledged (ACK) for an ARQ packet normally received from the transmitting HARQ entity, to a transmitting ARQ entity; and receiving, by the receiving HARQ entity, a retransmission packet for the missing ARO packet from the transmitting HARQ entity, wherein the NACK is sent from the transmitting HARQ entity to the transmitting ARQ entity and the retransmission packet is configured at the transmitting ARQ entity based on at least one missing ARQ packet detected according to the NACK and the ACK.

12. The method of claim 11, wherein the ACK includes a last sequence number among sequence numbers of normally transmitted consecutive ARQ packets, and identifier information of a corresponding ARQ entity that has processed the ARQ packets.

13. The method of claim 12, wherein the ACK further includes a type bit indicating presence/absence of a missing packet.

14. The method of claim 11, wherein the ACK further includes information indicating a number of missing packets.

15. A transmission apparatus for retransmitting high-speed packet data in a mobile communication system that simultaneously performs Automatic Retransmission reQuest (ARQ) that retransmits an ARQ packet reconfigured by allocating a sequence number to data delivered from an upper layer, and Hybrid Automatic Retransmission reQuest (HARQ) that multiplexes a plurality of ARQ packets into one HARQ packet and performs repeated retransmission on the HARQ packet within a maximum retransmission limit value, the apparatus comprising:

a transmitting HARQ entity for reporting a Negative Acknowledgement (NACK) for a missing ARQ packet; and a transmitting ARQ entity for receiving an Acknowledged (ACK) for ARQ packets from a receiving ARQ entity, detecting at least one missing ARQ packet according to the NACK and the ACK, configuring a retransmission packet with the detected ARQ packet, and retransmitting the retransmission packet.

16. The transmission apparatus of claim 15, wherein the ACK includes a last sequence number among sequence numbers of normally transmitted consecutive ARQ packets, and identifier information of a corresponding ARQ entity that has processed the ARQ packets.

17. The transmission apparatus of claim 16, wherein the ACK further includes a type bit indicating presence/absence of a missing packet.

18. The transmission apparatus of claim 16, wherein the ACK further includes information indicating a number of missing packets.

19. The transmission apparatus of claim 15, wherein the transmitting HARQ entity performs HARQ on an ARQ packet by ARQ packet basis.

20. The transmission apparatus of claim 15, wherein the transmitting HARQ entity sends a NACK to the transmitting ARQ entity when a number of retransmissions performed exceeds the maximum retransmission limit value.

21. The transmission apparatus of claim 15, wherein the transmitting HARQ entity receives a NACK for an ARQ packet from a receiving HARQ entity and forwards the NACK to the transmitting ARQ entity.

22. The transmission apparatus of claim 15, wherein the transmitting ARQ entity, after receiving a NACK for a missing ARQ packet from the receiving HARQ entity, updates a retransmission buffer, and retransmits a desired retransmission packet to the transmitting HARQ entity according to the updated retransmission buffer.

23. The transmission apparatus of claim 16, wherein the transmitting ARQ entity:

receives an ACK including a last sequence number among sequence numbers of normally received consecutive ARQ packets from the receiving ARQ entity, and determines whether the ARQ packet is in a course of retransmission depending on an updated retransmission buffer; and prevents ARQ retransmission when the ARQ packet is in a course of retransmission.

24. The transmission apparatus of claim 16, wherein the transmitting ARQ entity checks missing ARQ packets depending on the ACK and the NACK, updates a retransmission buffer such that a lowest sequence number among sequence numbers of the missing ARQ packets is allocated in a 'First Sequence Number' field and sequence numbers succeeding the lowest sequence number are allocated in a configuration field, and performs retransmission by transmitting a desired retransmission packet to the transmitting HARQ entity according to the updated retransmission buffer.

25. The transmission apparatus of claim 17, wherein the transmitting ARQ entity receives from the receiving ARQ entity the ACK including a last sequence number among sequence numbers of normally received packets and a number of missing packets, configures from the ACK a retransmission packet including a number of missing packets whose sequence numbers succeed the last sequence number among the sequence numbers of the normally received packets, and retransmits the retransmission packet to the transmitting HARQ entity.

26. The transmission apparatus of claim 25, wherein the transmitting ARQ entity retransmits a packet which is not in a course of retransmission, among the missing packets whose sequence numbers follow the last sequence number.

* * * * *